US012678858B2

(12) United States Patent
Hyeon et al.

(10) Patent No.: US 12,678,858 B2
(45) Date of Patent: Jul. 14, 2026

(54) ALLOY NANOPARTICLES, METHOD FOR FORMING THE ALLOY NANOPARTICLES, AND ALLOY NANOCATALYST COMPRISING THE ALLOY NANOPARTICLES

(71) Applicants: SEOUL NATIONAL UNIVERSITY R&DB FOUNDATION, Seoul (KR); INSTITUTE FOR BASIC SCIENCE, Daejeon (KR)

(72) Inventors: Taeghwan Hyeon, Seoul (KR); Yung-Eun Sung, Seoul (KR); Tae Yong Yoo, Seoul (KR); Ji Mun Yoo, Seoul (KR)

(73) Assignees: SEOUL NATIONAL UNIVERSITY R&DB FOUNDATION, Seoul (KR); INSTITUTE FOR BASIC SCIENCE, Daejeon (KR)

( * ) Notice: Subject to any disclaimer, the term of this patent is extended or adjusted under 35 U.S.C. 154(b) by 716 days.

(21) Appl. No.: 17/997,879

(22) PCT Filed: May 7, 2021

(86) PCT No.: PCT/KR2021/005704
§ 371 (c)(1),
(2) Date: Nov. 3, 2022

(87) PCT Pub. No.: WO2021/225395
PCT Pub. Date: Nov. 11, 2021

(65) Prior Publication Data
US 2023/0226604 A1    Jul. 20, 2023

(30) Foreign Application Priority Data
May 7, 2020    (KR) ........................ 10-2020-0054195

(51) Int. Cl.
*B22F 1/054*        (2022.01)
*B01J 21/18*        (2006.01)
(Continued)

(52) U.S. Cl.
CPC ............... *B22F 1/054* (2022.01); *B01J 21/18* (2013.01); *B01J 23/8906* (2013.01); *B01J 35/45* (2024.01);
(Continued)

(58) Field of Classification Search
None
See application file for complete search history.

(56) References Cited

U.S. PATENT DOCUMENTS 6,232,264 B1    5/2001    Lukehart et al.
8,912,114 B2    12/2014    Mukerjee
(Continued)

FOREIGN PATENT DOCUMENTS

CN        105879897 A    *    8/2016
CN        106378449 B        5/2019
(Continued)

OTHER PUBLICATIONS

English translation of CN 105879897 (originally published Aug. 24, 2016), obtained from PE2E search.*

*Primary Examiner* — David C Mellon

(57)    ABSTRACT

Alloy nanoparticles, and a method for forming the alloy nanoparticles, an alloy nanocatalyst comprising the alloy nanoparticles are provided. The alloy nanoparticles are formed by a method comprising mixing a first metal complex including a first metal and a second metal complex including a second metal to form a multimetal compound and heat-treating the multimetal compound to form an alloy compound. The first metal and the second metal comprise transition metal, the first metal complex comprises a pyri-
(Continued)

Decomposition
~500 °C

Annealing
700 °C
6 hr

[Fe(bpy)₃]²⁺[PtCl₆]²⁻ / GO        Intermediate        FePt/rGO dine-based ligand, and a carbon shell containing N is formed on the surface of the alloy compound by the heat treatment.

10 Claims, 16 Drawing Sheets

(51) Int. Cl.
| | | |
|---|---|---|
| *B01J 23/89* | (2006.01) | |
| *B01J 35/45* | (2024.01) | |
| *B01J 37/08* | (2006.01) | |
| *B01J 37/32* | (2006.01) | |
| *B22F 1/142* | (2022.01) | |
| *B22F 1/16* | (2022.01) | |

(52) U.S. Cl.
CPC .............. *B01J 37/088* (2013.01); *B01J 37/32* (2013.01); *B22F 1/142* (2022.01); *B22F 1/16* (2022.01); *B22F 2301/35* (2013.01)

(56) References Cited

U.S. PATENT DOCUMENTS

| | | | | |
|---|---|---|---|---|
| 10,384,201 | B2 | 8/2019 | Jeong | |
| 2005/0204865 | A1* | 9/2005 | Hirai | G11B 5/70605 |
| | | | | 75/348 |
| 2018/0272320 | A1* | 9/2018 | Nguyen | B01J 35/633 |
| 2021/0220912 | A1* | 7/2021 | Muresan | B22F 9/30 |

FOREIGN PATENT DOCUMENTS

| | | | |
|---|---|---|---|
| JP | 2016-154135 | A | 8/2016 |
| JP | 2018-193582 | A | 12/2018 |
| KR | 10-2014-0059166 | A | 5/2014 |
| KR | 10-2017-0056085 | A | 5/2017 |
| KR | 10-1838287 | B1 | 3/2018 |
| KR | 10-2018-0090175 | A | 8/2018 |
| KR | 10-2019-0065997 | A | 6/2019 |
| WO | 2012/151500 | A9 | 11/2012 |
| WO | 2020/065005 | A1 | 4/2020 |

* cited by examiner

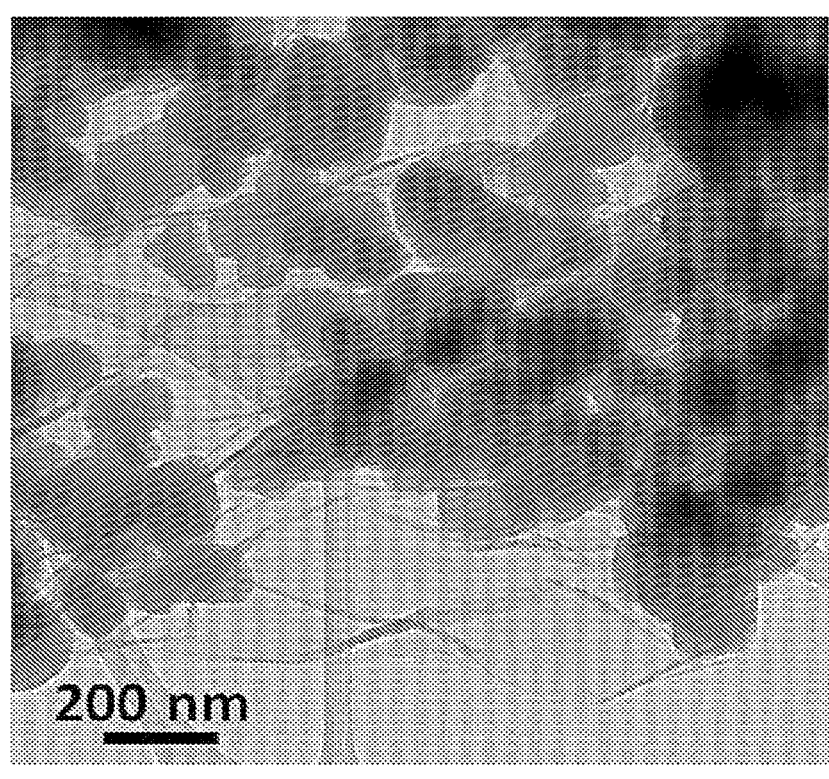
F i g . 2
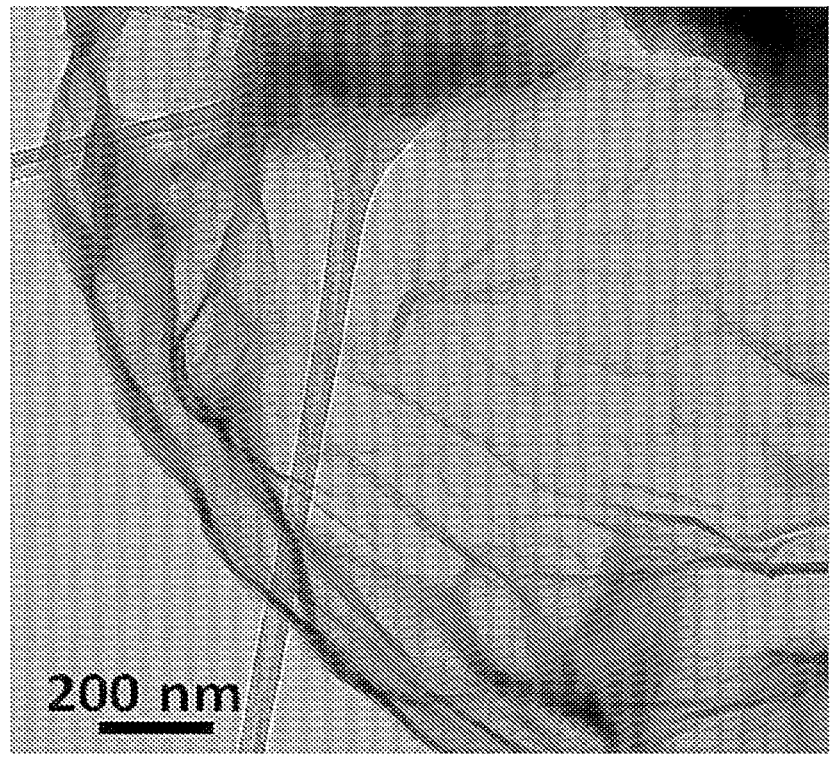
F i g . 3

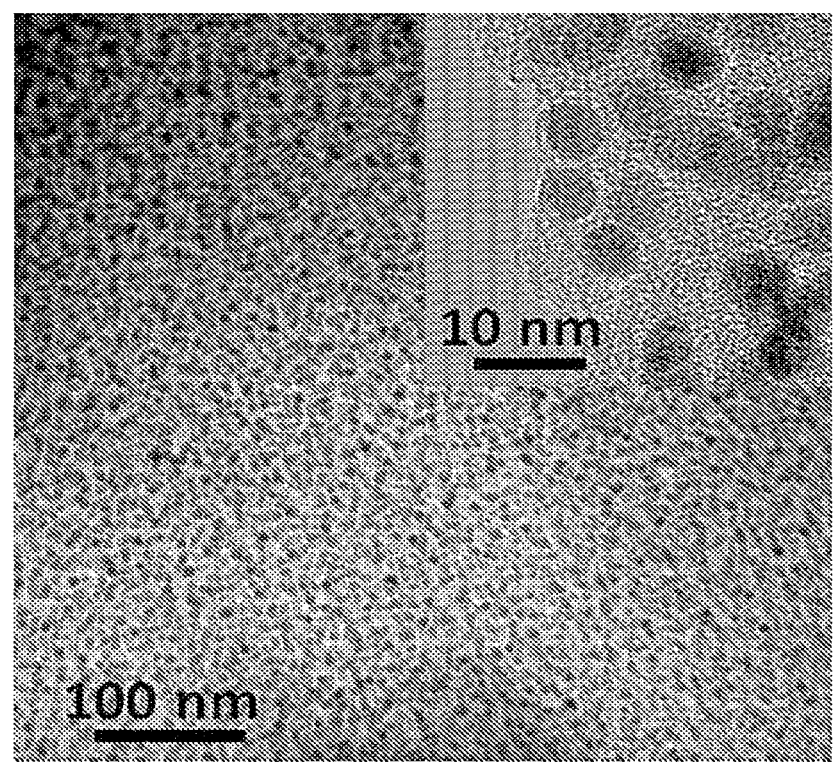
F i g . 4

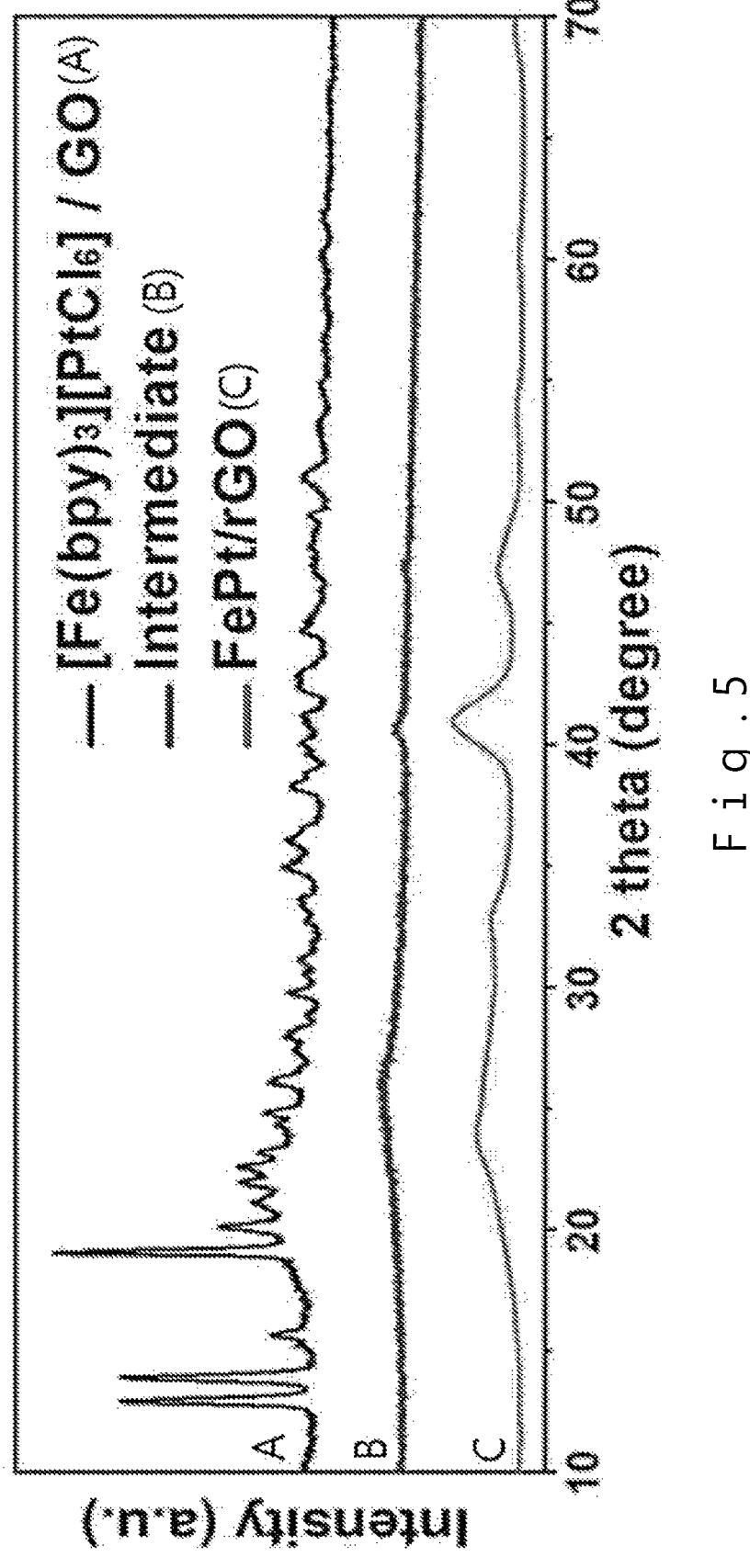
F i g . 5

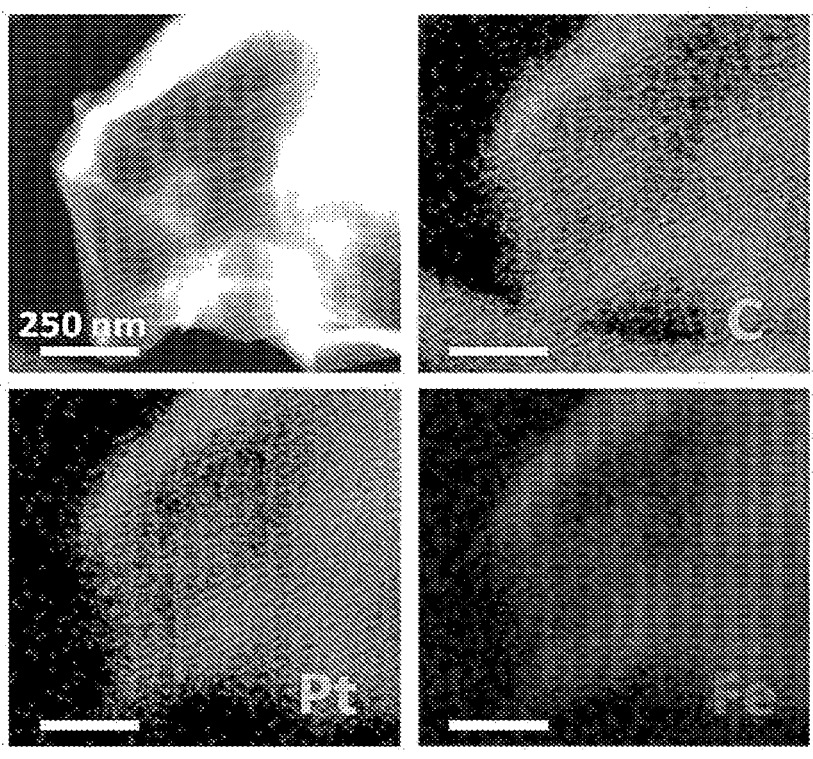
F i g . 7
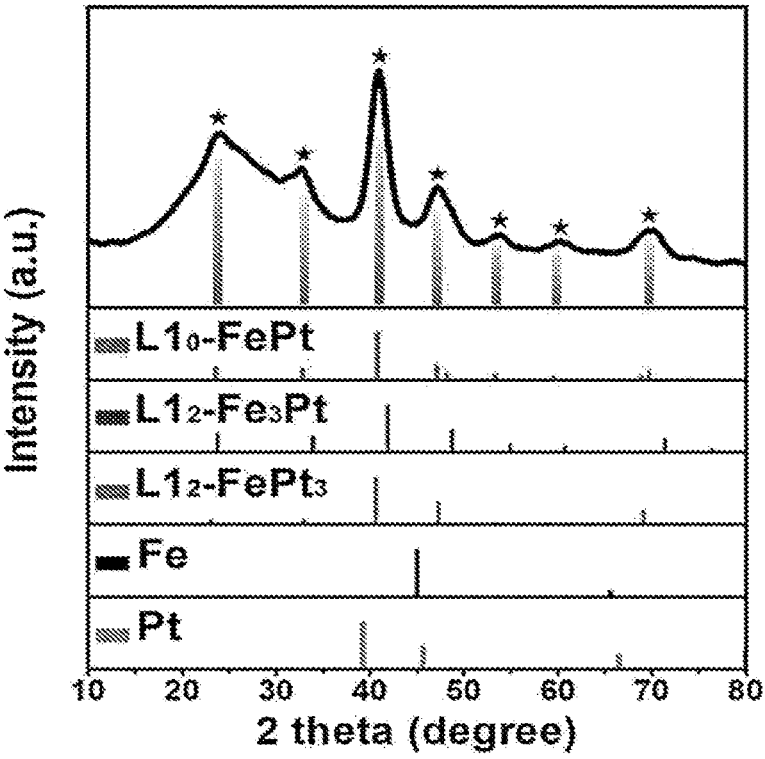
F i g . 8

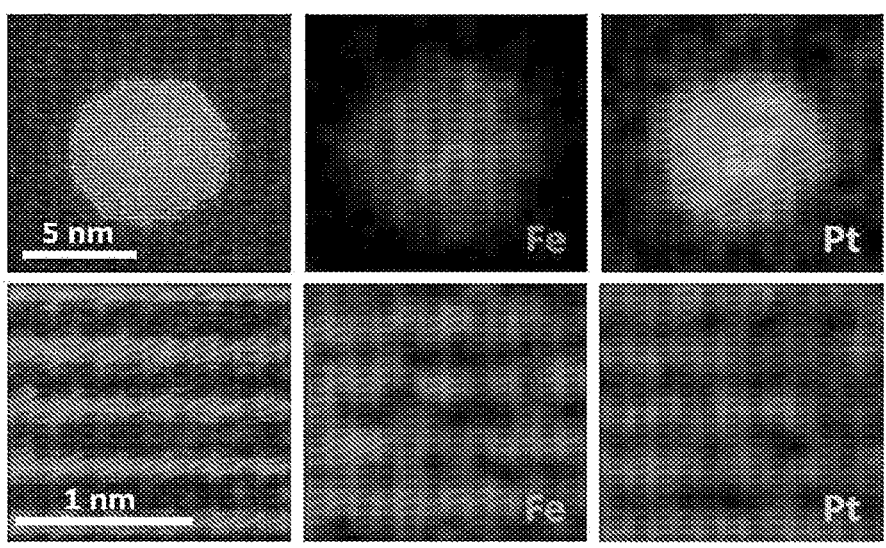
F i g . 11
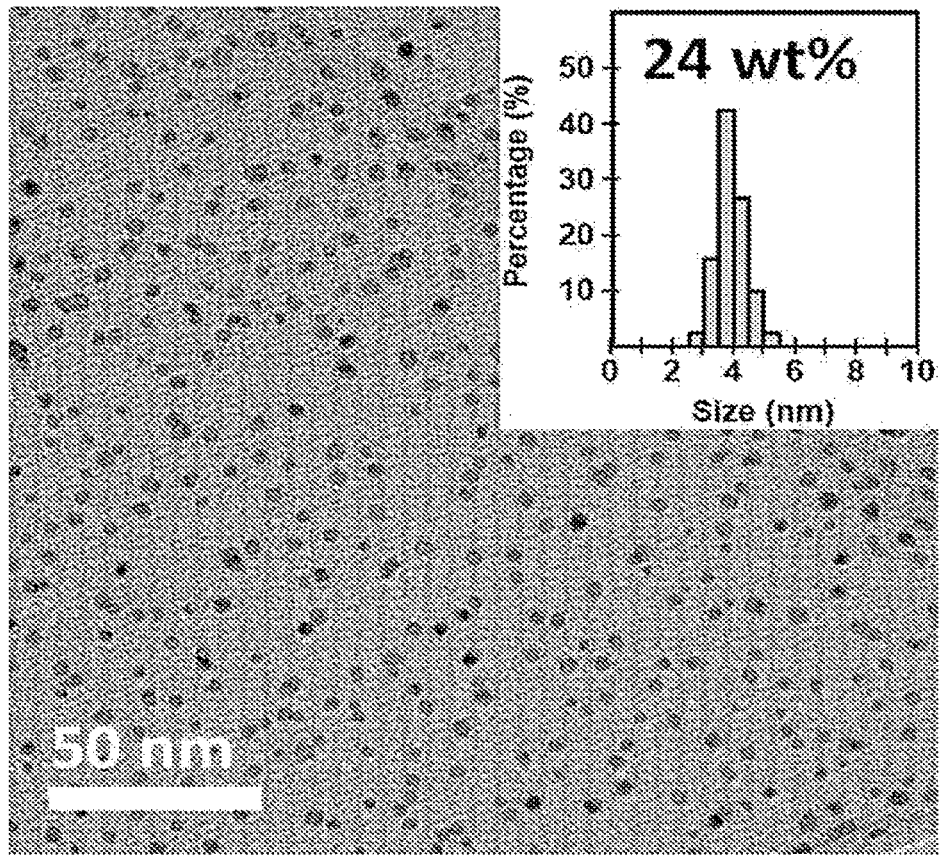
F i g . 12

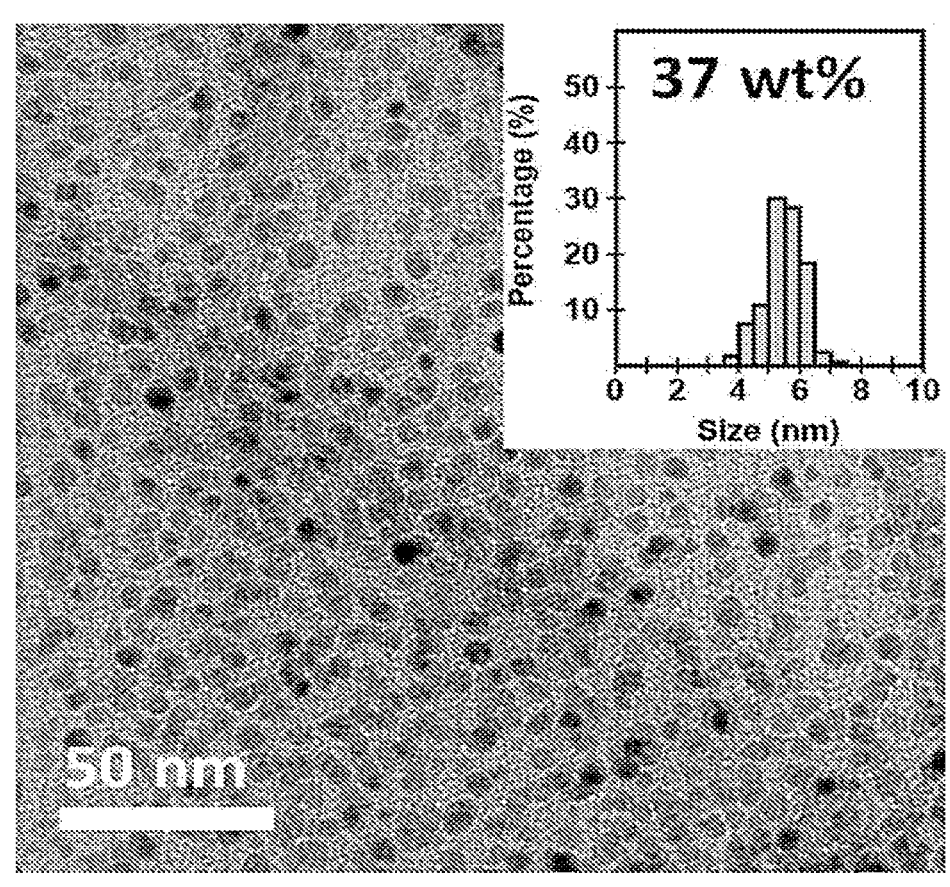
F i g . 13
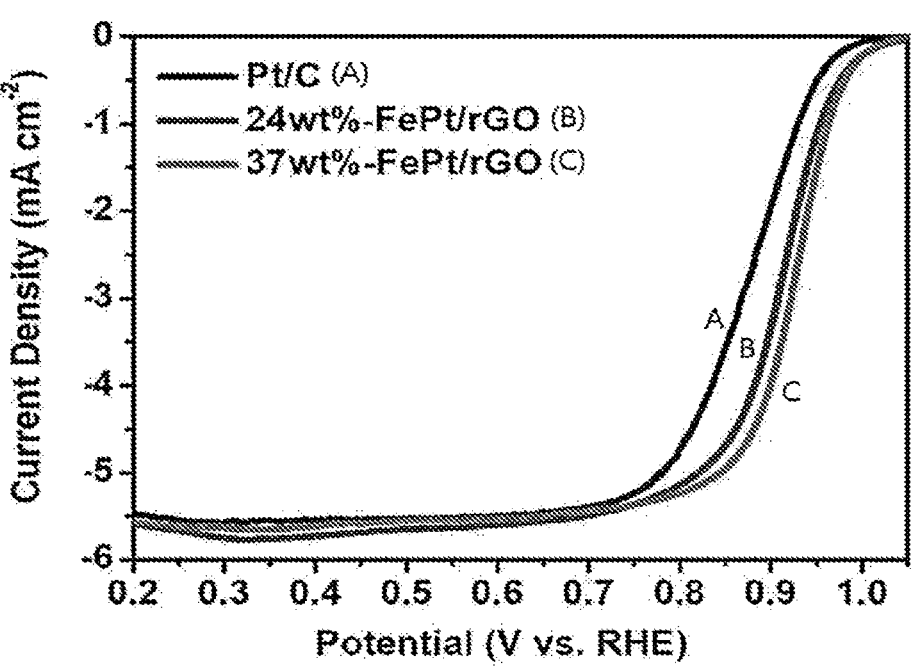
F i g . 14

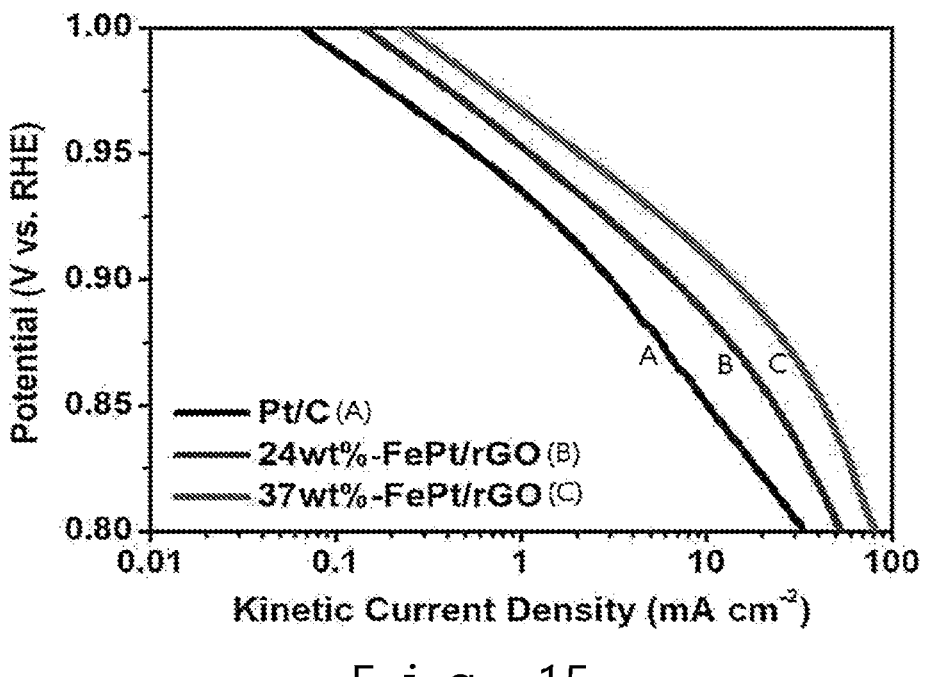
F i g . 15
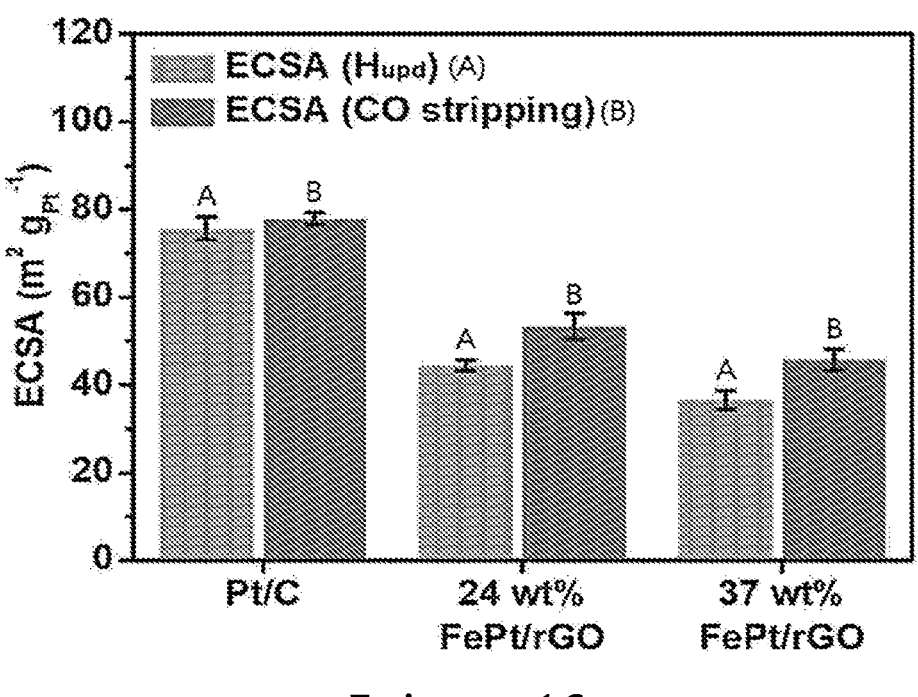
F i g . 16

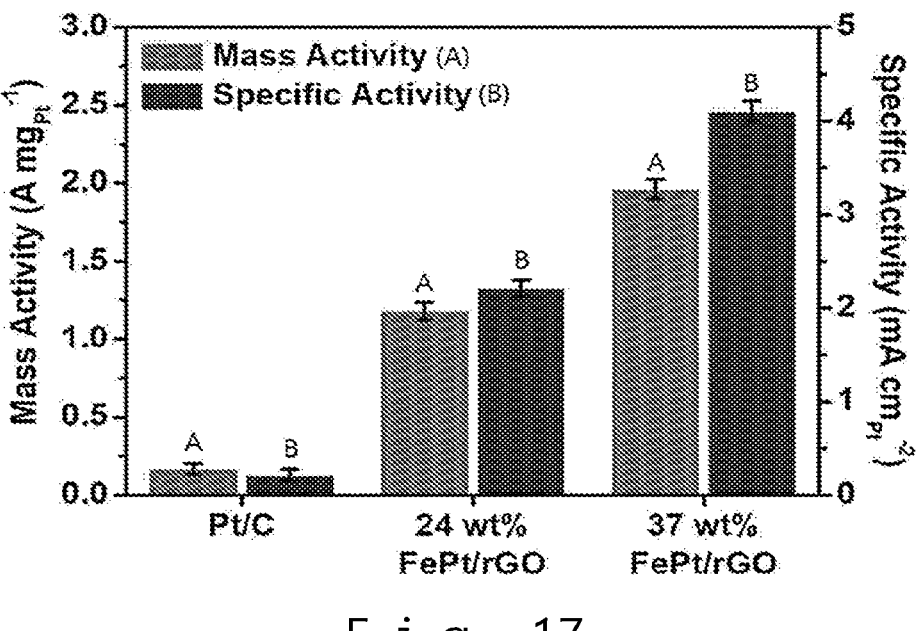
F i g . 17
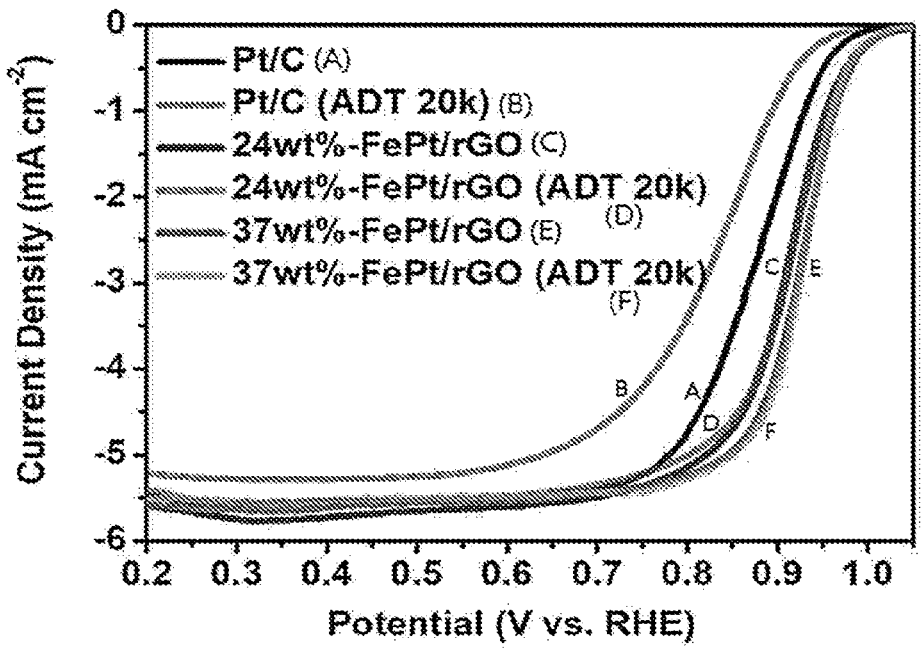
F i g . 18

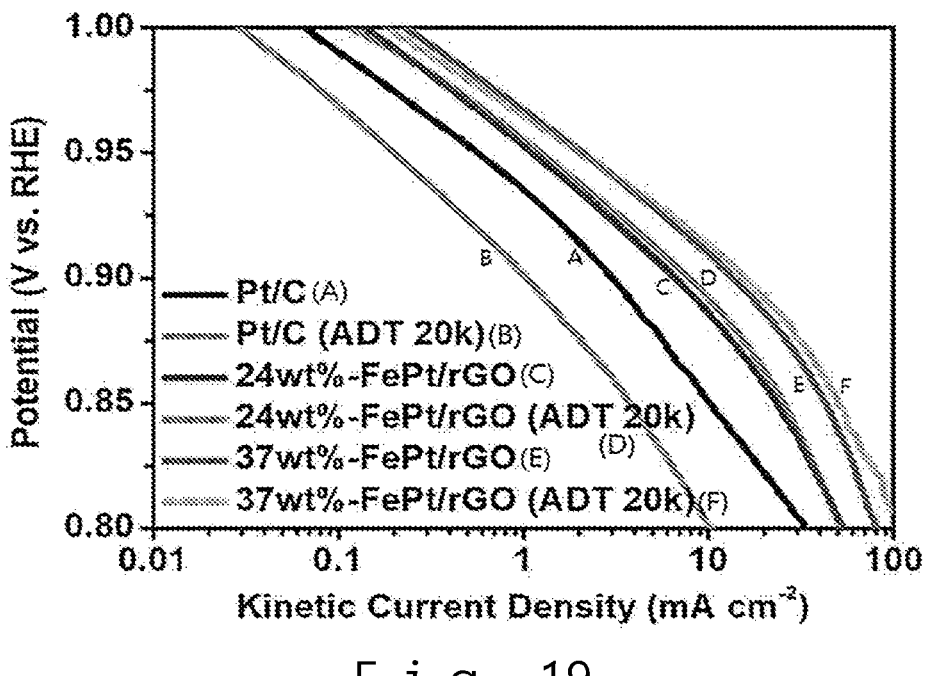
F i g . 19
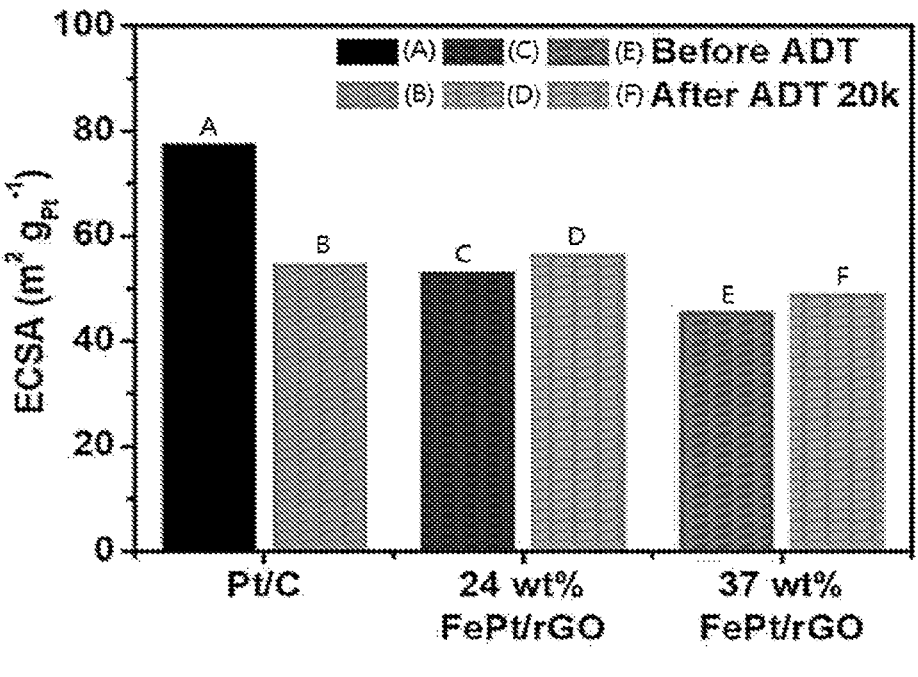
F i g . 20

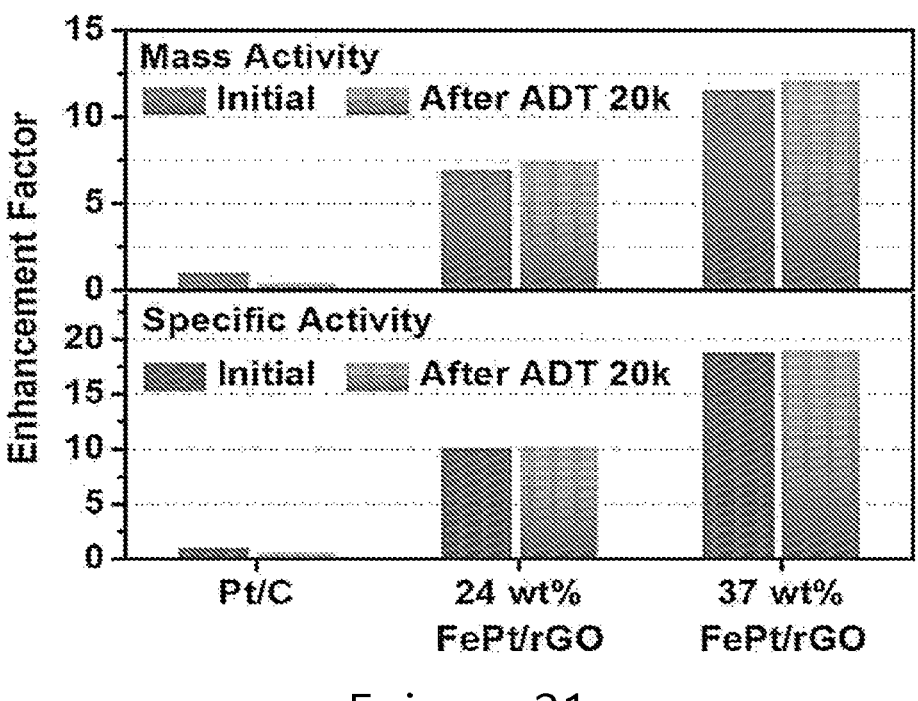
F i g . 21
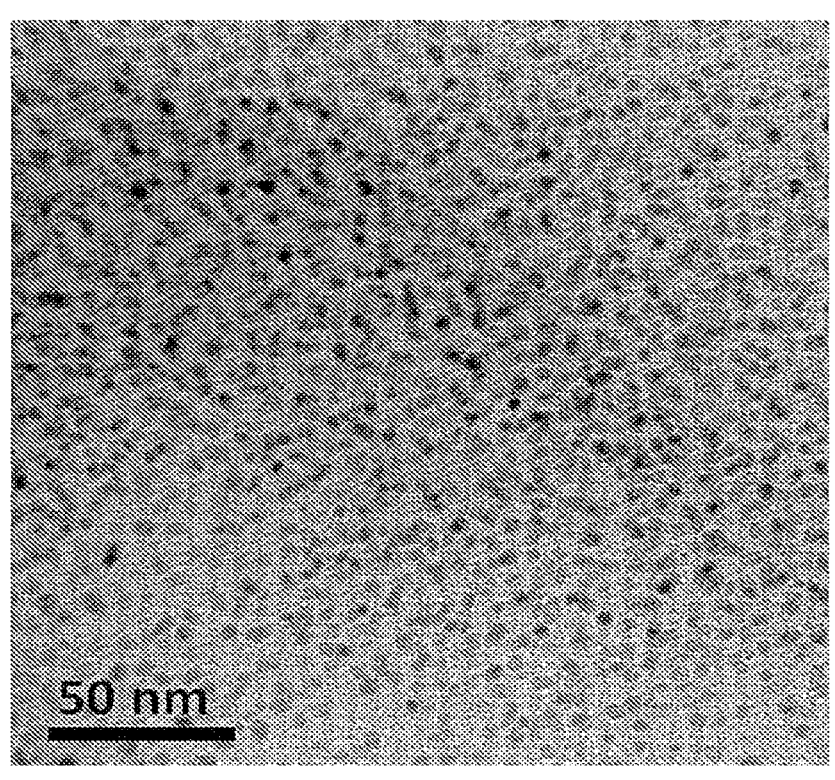
F i g . 22

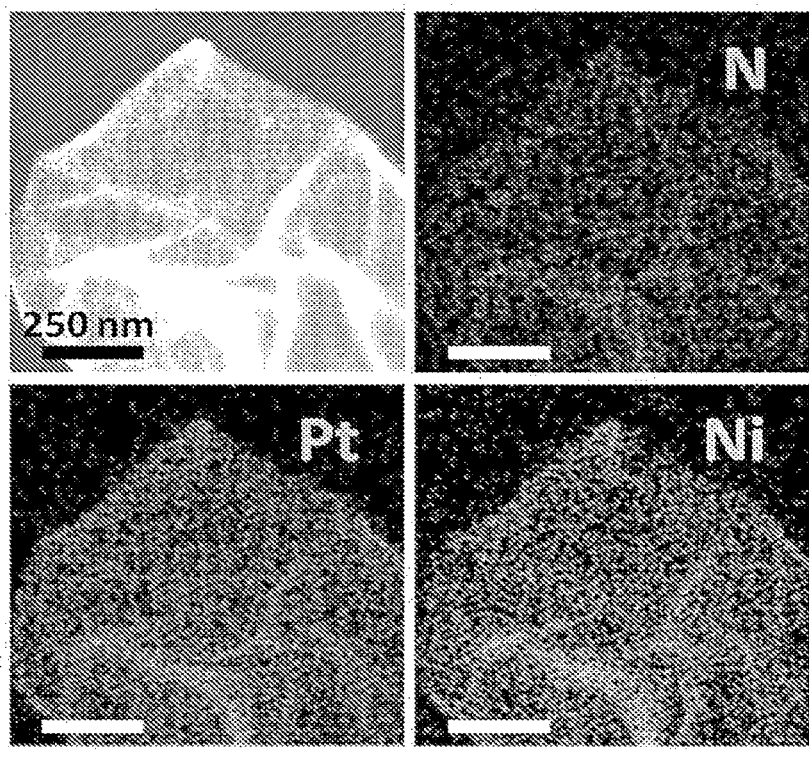
F i g . 23
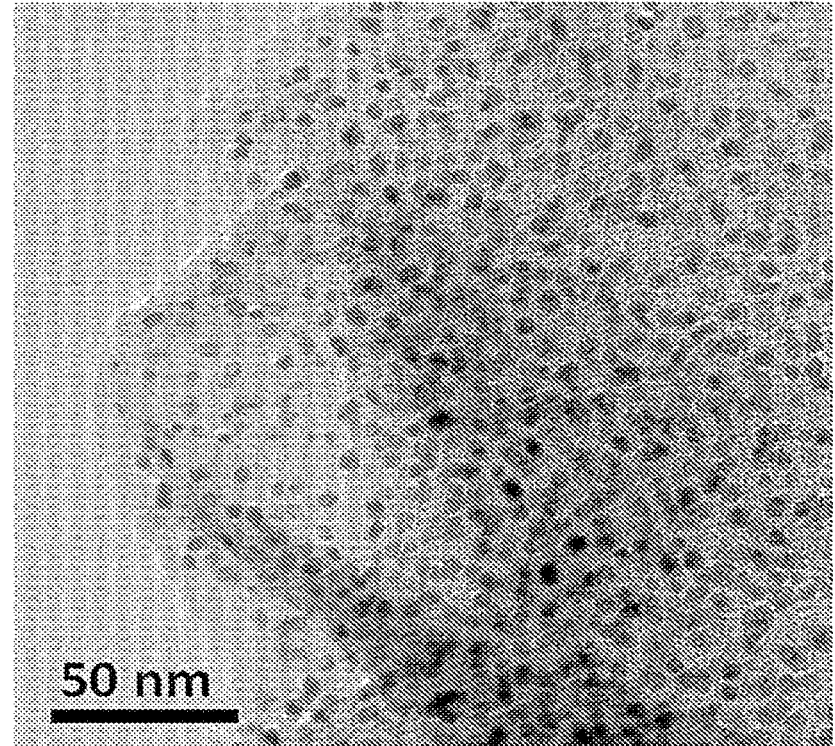
F i g . 24

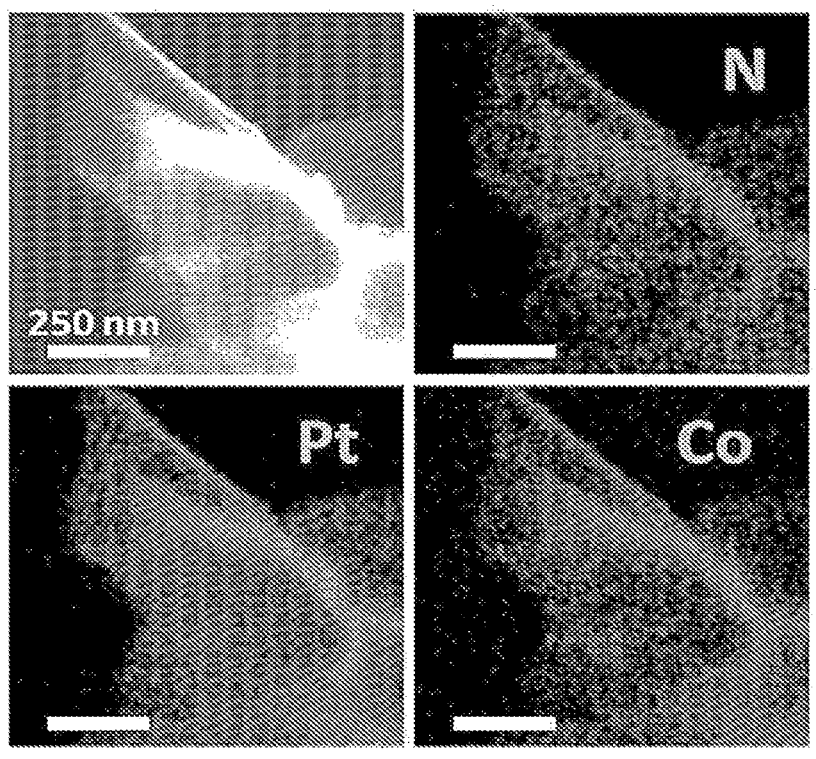
F i g . 25
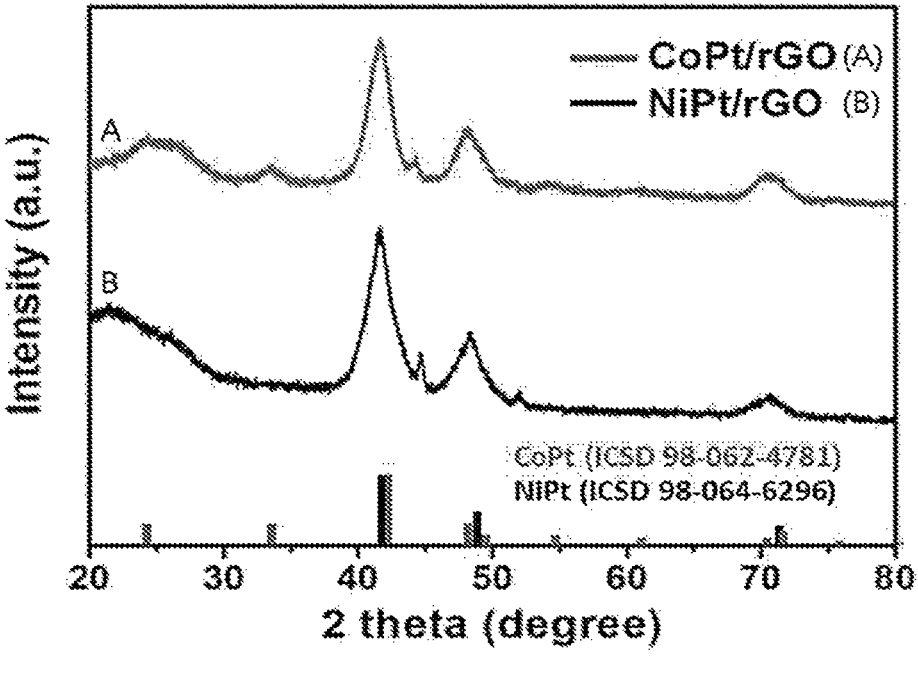
F i g . 26

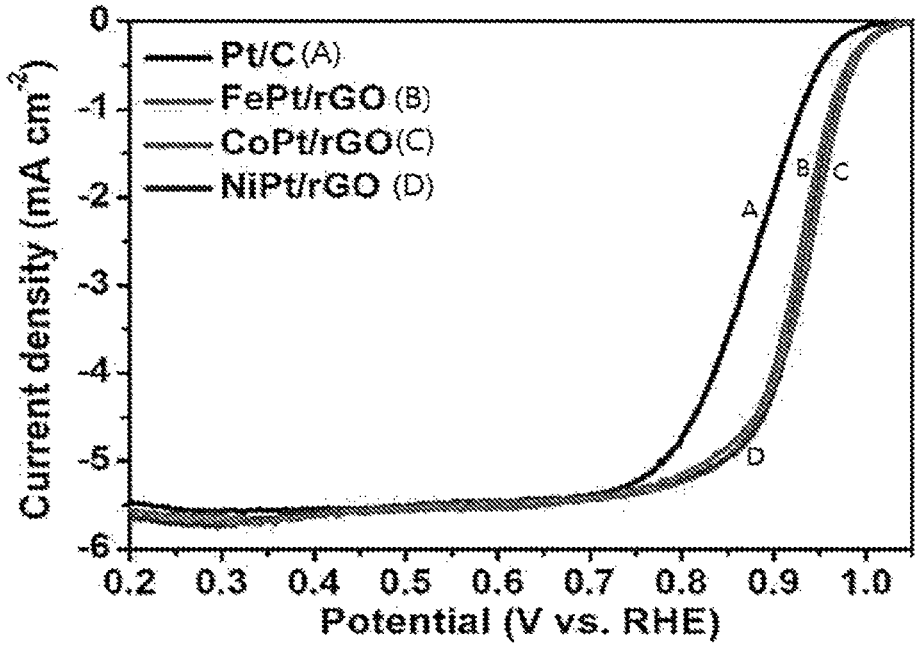
F i g . 27

ALLOY NANOPARTICLES, METHOD FOR FORMING THE ALLOY NANOPARTICLES, AND ALLOY NANOCATALYST COMPRISING THE ALLOY NANOPARTICLES

CROSS REFERENCE TO RELATED APPLICATIONS

The present application is a National Phase of International Application No. PCT/KR2021/005704 filed on May 7, 2021, which claims the priority benefit of Korean Patent Application No. 10-2020-0054195, filed on May 7, 2020, in the Korean Intellectual Property Office, the disclosures of which are incorporated herein by reference.

TECHNICAL FIELD

The present invention relates to alloy nanoparticles, a method for forming the alloy nanoparticles, and an alloy nanocatalyst comprising the alloy nanoparticles.

BACKGROUND ART

Alloy nanoparticles exhibit novel properties that distinguish them from single metal nanoparticles because they have unique electronic and geometric structures. In particular, it has been actively studied as a fuel cell electrocatalyst because it exhibits improved activity and stability compared to single metal-based catalysts.

Colloidal synthesis has been widely used for alloy nanoparticles because the size, composition and shape can be easily controlled. However, colloidal methods require toxic and expensive surfactants and reducing agents. In addition, additional steps such as loading of alloy nanoparticles on the support and removal of protective ligands are required.

As such, it is difficult to control the size, composition, and shape of the alloy nanoparticles, and the manufacturing process is complicated and the manufacturing cost is high.

DISCLOSURE

Technical Problem

In order to solve the above-mentioned problems, the present invention provides alloy nanoparticles having good performance.

The present invention provides a method for forming the alloy nanoparticles.

The present invention provides an alloy nanocatalyst having good performance.

The other objects of the present invention will be clearly understood by reference to the following detailed description and the accompanying drawings.

Technical Solution

Alloy nanoparticles according to the embodiments of the present invention are formed by a method comprising mixing a first metal complex including a first metal and a second metal complex including a second metal to form a multimetal compound and heat-treating the multimetal compound to form an alloy compound. The first metal and the second metal comprise transition metal, the first metal complex comprises a pyridine-based ligand, and a carbon shell containing N is formed on the surface of the alloy compound by the heat treatment.

The pyridine-based ligand may comprise at least one of a pyridine ligand and a polypyridine ligand, the pyridine ligand may comprise a pyridine and derivatives derived from the pyridine, and the polypyridine ligand may comprise a polypyridine and derivatives derived from the polypyridine.

The second metal complex may comprise a halogen element. The first metal may comprise at least one of Fe, Co, and Ni, and the second metal may comprise Pt.

The first metal complex may comprise $M^1(PY)_m{}^{a+}$ ($M^1$ represents the first metal, PY represents the pyridine-based ligand, and m represents an integer of 6 or less), and the second metal complex may comprise $M^2X_n{}^{a-}$ ($M^2$ represents the second metal, X represents a halogen element, and n represents an integer of 6 or less).

The first metal complex may comprise $[M^{1A}(PY)_m]_x[M^{1B}(PY)_m]_{1-x}{}^{a+}$ ($M^{1A}$ represents the first metal, $M^{1B}$ represents the first metal different from $M^{1A}$, PY represents the pyridine-based ligand, and m represents an integer of 6 or less), and the second metal complex may comprise $M^2X_n{}^{a-}$ ($M^2$ represents the second metal, X represents a halogen element, and n represents an integer of 6 or less).

The method may further comprise performing a thermal etching on the alloy compound, and at least a portion of the shell may be removed by the thermal etching.

The heat treatment may be performed after adsorbing the multimetal compound to a carbon support.

A method for forming the alloy nanoparticles according to the embodiments of the present invention comprises mixing a first metal complex including a first metal and a second metal complex including a second metal to form a multimetal compound, adsorbing the multimetal compound to a support, and heat-treating the multimetal compound to form an alloy compound. The first metal and the second metal comprise transition metal, the first metal complex comprises a pyridine-based ligand, and a carbon shell containing N is formed on the surface of the alloy compound by the heat treatment.

The pyridine-based ligand may comprise at least one of a pyridine ligand and a polypyridine ligand, the pyridine ligand may comprise a pyridine and derivatives derived from the pyridine, and the polypyridine ligand may comprise a polypyridine and derivatives derived from the polypyridine.

The second metal complex may comprise a halogen element. The first metal may comprise at least one of Fe, Co, and Ni, and the second metal may comprise Pt.

The first metal complex may comprise $M^1(PY)_m{}^{a+}$ ($M^1$ represents the first metal, PY represents the pyridine-based ligand, and m represents an integer of 6 or less), and the second metal complex may comprise $M^2X_n{}^{a-}$ ($M^2$ represents the second metal, X represents a halogen element, and n represents an integer of 6 or less).

The first metal complex may comprise $[M^{1A}(PY)_m]_x[M^{1B}(PY)_m]_{1-x}{}^{a+}$ ($M^{1A}$ represents the first metal, $M^{1B}$ represents the first metal different from $M^{1A}$, PY represents the pyridine-based ligand, and m represents an integer of 6 or less), and the second metal complex may comprise $M^2X_n{}^{a-}$ ($M^2$ represents the second metal, X represents a halogen element, and n represents an integer of 6 or less).

The method for forming alloy nanoparticles may further comprise performing a thermal etching on the alloy compound, and at least a portion of the shell may be removed by the thermal etching.

The first metal complex and the second metal complex may be coupled to each other through electrostatic attraction.

A wetting of the multimetal compound may occur on the support by the heat treatment, and the multimetal compound may be decomposed into the alloy compound.

The method for forming alloy nanoparticles may further comprise freeze-drying the support to which the multimetal compound is adsorbed before the heat treatment.

The support may comprise a carbon support.

An alloy nanocatalyst according to the embodiments of the present invention comprises the alloy nanoparticles.

Advantageous Effects

Alloy nanoparticles and an alloy nanocatalyst according to the embodiments of the present invention have good performance. For example, the alloy nanoparticles and the alloy nanocatalyst may have good activity and stability. The alloy nanoparticles and the alloy nanocatalyst can be easily formed by a simple process. The alloy nanocatalyst may have good ORR (oxygen reduction reaction) activity, and thus may be used as an electrocatalyst.

DESCRIPTION OF DRAWINGS

FIG. 2 shows a TEM image of the $[Fe(bpy)_3]$ $[PtCl_6]/GO$ in FIG. 1.

FIG. 3 shows a TEM image of the intermediate in FIG. 1.

FIG. 4 shows a TEM image of the FePt/rGO in FIG. 1.

FIG. 5 shows the results of powder XRD analysis of the $[Fe(bpy)_3]$ $[PtCl_6]/GO$, the intermediate, and the FePt/rGO.

FIG. 7 shows a STEM-EDS mapping image showing the uniform distribution of C, Pt, and Fe atoms in the intermediate.

FIG. 8 shows the XRD pattern of 37 wt % FePt/rGO.

FIG. 11 shows STEM-EDS images of a single FePt nanoparticle (top) and high magnification region (bottom) of 37 wt % FePt/rGO.

FIG. 12 shows a TEM image of 24 wt % FePt/rGO, and the inset shows the size distribution of FePt nanoparticles.

FIG. 13 shows a TEM image of 37 wt % FePt/rGO, and the inset shows the size distribution of FePt nanoparticles.

FIG. 14 shows ORR polarization curves of FePt/rGO catalyst and commercial Pt/C catalyst.

FIG. 15 shows Tafel plots of FePt/rGO catalyst and commercial Pt/C catalyst.

FIG. 16 shows ECSA of FePt/rGO catalyst and commercial Pt/C catalyst.

FIG. 17 shows the activity per unit weight and per unit area of FePt/rGO catalyst and commercial Pt/C catalyst.

FIG. 18 shows ORR polarization curves of FePt/rGO catalyst and commercial Pt/C catalyst before and after ADT (20,000 cycles).

FIG. 19 shows Tafel plots of FePt/rGO catalyst and commercial Pt/C catalyst before and after ADT (20,000 cycles).

FIG. 20 shows ECSA of FePt/rGO catalyst and commercial Pt/C catalyst before and after ADT (20,000 cycles).

FIG. 21 shows activities per unit weight and per unit area of FePt/rGO catalyst and commercial Pt/C catalyst before and after ADT (20,000 cycles).

FIG. 22 shows a TEM image of NiPt/rGO (46 wt %).

FIG. 23 shows STEM-EDS images of NiPt/rGO (46 wt %).

FIG. 24 shows a TEM image of CoPt/rGO (22 wt %).

FIG. 25 shows STEM-EDS images of CoPt/rGO (22 wt %).

FIG. 26 shows powder XRD patterns of NiPt/rGo and CoPt/rGo.

FIG. 27 shows ORR polarization curves of NiPt/rGo and CoPt/rGo.

BEST MODE

Figure 1:
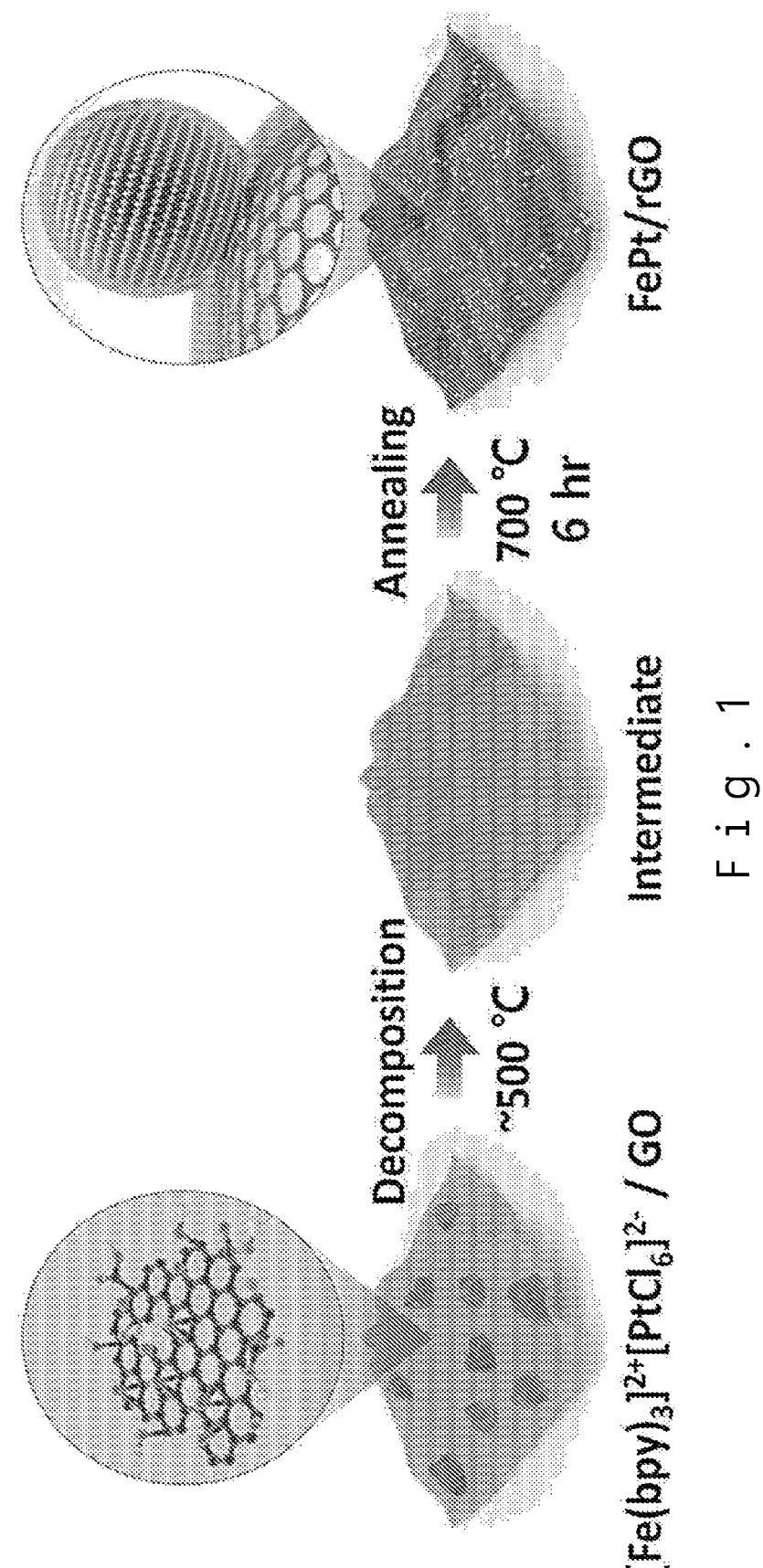
FIG. 1 schematically shows a method for forming ordered FePt alloy nanoparticles having a carbon shell containing N and supported by reduced graphene oxide (rGO).

Hereinafter, a detailed description will be given of the present invention with reference to the following embodiments. The purposes, features, and advantages of the present invention will be easily understood through the following embodiments. The present invention is not limited to such embodiments, but may be modified in other forms. The embodiments to be described below are nothing but the ones provided to bring the disclosure of the present invention to perfection and assist those skilled in the art to completely understand the present invention. Therefore, the following embodiments are not to be construed as limiting the present invention.

Terms like 'first', 'second', etc., may be used to indicate various components, but the components should not be restricted by the terms. These terms are only used to distinguish one element, component, region, layer or section from another element, component, region, layer or section. A first element, component, region, layer or section could be termed a second element, component, region, layer or section without departing from the teaching of the embodiments of the present invention.

The terminology used herein is for the purpose of describing particular embodiments only and is not intended to limit the invention. It is to be understood that the singular forms "a," "an," and "the" include plural references unless the context clearly dictates otherwise. It will be further understood that the terms "comprises" or "has," when used in this specification, specify the presence of stated features, integers, steps, operations, elements, and/or components, but do not preclude the presence or addition of one or more other features, integers, steps, operations, elements, components, and/or groups thereof.

Alloy nanoparticles according to the embodiments of the present invention are formed by a method comprising mixing a first metal complex including a first metal and a second metal complex including a second metal to form a multimetal compound and heat-treating the multimetal compound to form an alloy compound. The first metal and the second metal comprise transition metal, the first metal complex comprises a pyridine-based ligand, and a carbon shell containing N is formed on the surface of the alloy compound by the heat treatment.

The pyridine-based ligand may comprise at least one of a pyridine ligand and a polypyridine ligand, the pyridine ligand may comprise a pyridine and derivatives derived from the pyridine, and the polypyridine ligand may comprise a polypyridine and derivatives derived from the polypyridine. The polypyridine may comprise bipyridine, phenanthroline, terpyridine, quaterpyridine, and the like.

The second metal complex may comprise a halogen element. The first metal may comprise at least one of Fe, Co, and Ni, and the second metal may comprise Pt.

The first metal complex may comprise $M^1(PY)_m{}^{a+}$ ($M^1$ represents the first metal, PY represents the pyridine-based ligand, and m represents an integer of 6 or less), and the second metal complex may comprise $M^2X_n{}^{a-}$ ($M^2$ represents the second metal, X represents a halogen element, and n represents an integer of 6 or less).

The first metal complex may comprise $[M^{1A}(PY)_m]_x[M^{1B}(PY)_m]_{1-x}{}^{a+}$ ($M^{1A}$ represents the first metal, $M^{1B}$ represents the first metal different from $M^{1A}$, PY represents the pyridine-based ligand, and m represents an integer of 6 or less), and the second metal complex may comprise $M^2X_n{}^{a-}$ ($M^2$ represents the second metal, X represents a halogen element, and n represents an integer of 6 or less). Just as the first metal complex is expanded to include two or more different first metals, the second metal complex is not limited to $M^2X_n{}^{a-}$ and may be expanded to include two or more different second metals.

The method may further comprise performing a thermal etching on the alloy compound, and at least a portion of the shell may be removed by the thermal etching.

The heat treatment may be performed after adsorbing the multimetal compound to a carbon support. The carbon support may comprise graphene oxide or the like.

A method for forming the alloy nanoparticles according to the embodiments of the present invention comprises mixing a first metal complex including a first metal and a second metal complex including a second metal to form a multimetal compound, adsorbing the multimetal compound to a support, and heat-treating the multimetal compound to form an alloy compound. The first metal and the second metal comprise transition metal, the first metal complex comprises a pyridine-based ligand, and a carbon shell containing N is formed on the surface of the alloy compound by the heat treatment.

The pyridine-based ligand may comprise at least one of a pyridine ligand and a polypyridine ligand, the pyridine ligand may comprise a pyridine and derivatives derived from the pyridine, and the polypyridine ligand may comprise a polypyridine and derivatives derived from the polypyridine. The polypyridine may comprise bipyridine, phenanthroline, terpyridine, quaterpyridine, and the like.

The second metal complex may comprise a halogen element. The first metal may comprise at least one of Fe, Co, and Ni, and the second metal may comprise Pt.

The first metal complex may comprise $M^1(PY)_m{}^{a+}$ ($M^1$ represents the first metal, PY represents the pyridine-based ligand, and m represents an integer of 6 or less), and the second metal complex may comprise $M^2X_n{}^{a-}$ ($M^2$ represents the second metal, X represents a halogen element, and n represents an integer of 6 or less).

The first metal complex may comprise $[M^{1A}(PY)_m]_x[M^{1B}(PY)_m]_{1-x}{}^{a+}$ ($M^{1A}$ represents the first metal, $M^{1B}$ represents the first metal different from $M^{1A}$, PY represents the pyridine-based ligand, and m represents an integer of 6 or less), and the second metal complex may comprise $M^2X_n{}^{a-}$ ($M^2$ represents the second metal, X represents a halogen element, and n represents an integer of 6 or less). Just as the first metal complex is expanded to include two or more different first metals, the second metal complex is not limited to $M^2X_n{}^{a-}$ and may be expanded to include two or more different second metals.

The method for forming alloy nanoparticles may further comprise performing a thermal etching on the alloy compound, and at least a portion of the shell may be removed by the thermal etching.

The first metal complex and the second metal complex may be coupled to each other through electrostatic attraction.

A wetting of the multimetal compound may occur on the support by the heat treatment, and the multimetal compound may be decomposed into the alloy compound.

The method for forming alloy nanoparticles may further comprise freeze-drying the support to which the multimetal compound is adsorbed before the heat treatment.

The support may comprise a carbon support. The carbon support may comprise graphene oxide or the like.

An alloy nanocatalyst according to the embodiments of the present invention comprises the alloy nanoparticles.

FIG. 1 schematically shows a method for forming ordered FePt alloy nanoparticles having a carbon shell containing N and supported by reduced graphene oxide (rGO), FIG. 2 shows a TEM image of the [Fe(bpy)₃] [PtCl₆]/GO in FIG. 1, FIG. 3 shows a TEM image of the intermediate in FIG. 1, and FIG. 4 shows a TEM image of the FePt/rGO in FIG. 1.

Referring to FIGS. 1 to 4, FePt alloy nanoparticles can be formed through two main steps. In the first step, a bimetallic [Fe(bpy)₃] [PtCl₆] compound (represented as FePt compound) is formed by electrostatic attraction between a cationic $Fe(bpy)_3{}^{2+}$ complex and an equimolar anionic $PtCl_6{}^{2-}$ complex. In the second step, the FePt compound adsorbed on graphene oxide can be directly converted into bimetallic alloy nanoparticles by annealing at 700° C.

A pale yellow aqueous $FeSO_4$ immediately turns into dark red upon addition of 2,2'-bipyridine (bpy) due to the formation of $Fe(bpy)_3{}^{2+}$ complex.

Addition of ethanolic $H_2PtCl_6$ into the $Fe(bpy)_3SO_4$ solution leads to the rapid precipitation of the FePt compound, which can be easily obtained as a fine powder after centrifugation and grinding. The atomic ratios of Fe and Pt are close to 1:1 over the five different sites, which was clearly confirmed by energy-dispersive X-ray spectroscopy (EDS) in scanning transmission electron microscopy (STEM).

According to the powder XRD analysis results, the FePt compound has a completely different crystal structure from the $Fe(bpy)_3SO_4$ salt and has high crystallinity. In addition, based on the UV-vis absorption spectra of aqueous FePt compound, the existence of $Fe(bpy)_3{}^{2+}$ and $PtCl_6{}^{2-}$ complexes and the electrostatic attraction therebetween were analyzed. The absorption features of the two complexes confirm the existence of the anionic and cationic complexes, while a significant red-shift of 524 nm peak to 538 nm indicates an electrostatic attraction between them. Conversely, the sequential dilution of the FePt compound results in a peak shift from 538 nm back to 524 nm, showing the weakening of the electrostatic attraction between Fe and Pt complexes.

The FePt compound can be adsorbed on the GO surface in deionized water and then freeze-dried to prevent the GO layers from severe stacking. This mixture is heated to 700° C., during which a complete wetting of the FePt compound onto the GO occurs followed by decomposition of the FePt compound into bimetallic alloy nanoparticles Synthesis Example of FePt Compound 1) Synthesis Example 1

0.5 mmol of $FeSO_4 \cdot 7H_2O$ is dissolved in 15 mL of deionized (DI) water (or 15 mL ethanol) and 1.5 mmol of 2,2'-bipyridine is dissolved in 15 mL of ethanol (99.9%) separately. These two solutions are mixed to form [Fe(bpy)$_3$]SO$_4$ (bpy represents 2,2'-bipyridine), which is stirred at room temperature. To this solution, a 30 mL ethanol solution in which 0.5 mmol of H$_2$PtCl$_6$·6H$_2$O is dissolved is added at a time, and the mixture is stirred for 5 hours. The product is easily separated by centrifugation at 10,000 rpm (10 min). The product is washed several times with ethanol, centrifuged and dried in an oven at 40° C. The dried product is pulverized to obtain fine powder. Thereby, the FePt compound ([Fe(bpy)$_3$] [PtCl$_6$]) is formed.

2) Synthesis Example 2

0.5 mmol of FeSO$_4$·7H$_2$O is dissolved in 15 mL of deionized (DI) water (or 15 mL ethanol) and 1.5 mmol of phenanthroline is dissolved in 15 mL of ethanol (99.9%) separately. These two solutions are mixed to form [Fe(phen)$_3$]SO$_4$ (phen represents phenanthroline), which is stirred at room temperature. To this solution, a 30 mL ethanol solution in which 0.5 mmol of H$_2$PtCl$_6$·6H$_2$O is dissolved is added at a time, and the mixture is stirred for 5 hours. The product is easily separated by centrifugation at 10,000 rpm (10 min). The product is washed several times with ethanol, centrifuged and dried in an oven at 40° C. The dried product is pulverized to obtain fine powder. Thereby, the FePt compound ([Fe(phen)$_3$] [PtCl$_6$]) is formed.

3) Synthesis Example 3

0.5 mmol of FeSO$_4$·7H$_2$O is dissolved in 15 mL of deionized (DI) water (or 15 mL ethanol) and 1.0 mmol of terpyridine is dissolved in 15 mL of ethanol (99.9%) separately. These two solutions are mixed to form [Fe(terpy)$_3$] SO$_4$ (therpy represents terpyridine), which is stirred at room temperature. To this solution, a 30 mL ethanol solution in which 0.5 mmol of H$_2$PtCl$_6$·6H$_2$O is dissolved is added at a time, and the mixture is stirred for 5 hours. The product is easily separated by centrifugation at 10,000 rpm (10 min). The product is washed several times with ethanol, centrifuged and dried in an oven at 40° C. The dried product is pulverized to obtain fine powder. Thereby, the FePt compound ([Fe(terpy)$_3$] [PtCl$_6$]) is formed.

Synthesis Example of FePt/rGO

The FePt compound (36 mg and 144 mg FePt compound for loading about 24 wt % and 37 wt % of FePt) is dispersed in 80 mL of deionized water. The mixture in which the FePt compound is dispersed is sonicated for 10 minutes, stirred for 2 hours, and then 10 mL of an GO aqueous solution (4 mg/mL) is added dropwise. The mixture to which the GO aqueous solution is added is stirred for 2 hours and then freeze-dried to adsorb the FePt compound to the GO. The mixture containing FePt compound grains on GO foam is heat-treated at 700° C. for 6 hours in an argon flow of 100 sccm, during the heat treatment, wetting and decomposition of the FePt compound occurred on the GO surface, forming atomically ordered FePt alloy nanoparticles on rGO (FePt/rGO).

Synthesis Example of FePt Nanoparticles on Different Carbon Supports

The synthesis of FePt nanoparticles on carbon nanotube (CNT, 7-8 wt % in water) is performed according to the same procedure as that for FePt/rGO except that CNT aqueous solution is added dropwise instead of the GO solution.

The synthesis of FePt nanoparticles on Ketjen Black (KB) and Vulcan XC (VC) is performed by the following procedure. After dispersing a certain amount of FePt compound in 80 mL of isopropanol (or ethanol), the solution is sonicated for 10 min and stirred for 2 h. 50 mg of KB or VC powder is added into the solution containing FePt compound and this mixture is sonicated for 10 min and stirred for 2 h. The mixture containing FePt compound grains on carbon support is obtained by rotary evaporation and dried in oven at 40° C. The dried powder is ground and then heat-treated at 700° C. under argon atmosphere.

Synthesis Examples of CoPt Nanoparticles and NiPt Nanoparticles on rGO

CoPt compounds (e.g., [Co(bpy)$_3$] [PtCl$_6$], [Co(phen)$_3$] [PtCl$_6$], [Co(terpy)$_2$] [PtCl$_6$]) and NiPt compounds (e.g., [Ni(bpy)$_3$] [PtCl$_6$] [Ni(phen))$_3$] [PtCl$_6$], [Ni(terpy)$_2$] [PtCl$_6$]) are prepared by the same procedure for the synthesis of FePt compound except that CoSO$_4$·7H$_2$O and NiSO$_4$·6H$_2$O are used in place of FeSO$_4$·7H$_2$O. The subsequent synthetic processes for the synthesis of CoPt/rGO and NiPt/rGO is the same as that for the synthesis of FePt/rGO.

Synthesis Example of FeCoPt Compound

1) Synthesis Example 1

0.25 mmol of FeSO$_4$·7H$_2$O is dissolved in 7.5 mL of deionized (DI) water (or 7.5 mL ethanol) and 0.75 mmol of 2,2'-bipyridine is dissolved in 7.5 mL of ethanol (99.9%) separately. These two solutions are mixed to form [Fe(bpy)$_3$]SO$_4$ (bpy represents 2,2'-bipyridine), which is stirred at room temperature. 0.25 mmol of CoSO$_4$·7H$_2$O is dissolved in 7.5 mL of deionized (DI) water (or 7.5 mL ethanol) and 0.75 mmol of 2,2'-bipyridine is dissolved in 7.5 mL of ethanol (99.9%) separately. These two solutions are mixed to form [Co(bpy)$_3$]SO$_4$, which is stirred at room temperature.

The [Fe(bpy)$_3$]SO$_4$ solution and the [Co(bpy)$_3$]SO$_4$ solution are mixed and to this mixed solution, a 30 mL ethanol solution in which 0.5 mmol of H$_2$PtCl$_6$·6H$_2$O is dissolved is added at a time, and the mixture is stirred for 5 hours. The product is easily separated by centrifugation at 10,000 rpm (10 min). The product is washed several times with ethanol, centrifuged and dried in an oven at 40° C. The dried product is pulverized to obtain fine powder. Thereby, the FeCoPt compound ([Fe(bpy)$_3$]$_x$[Co(bpy)$_3$]$_{1-x}$[PtCl$_6$]) is formed.

2) Synthesis Example 2

0.25 mmol of FeSO$_4$·7H$_2$O is dissolved in 7.5 mL of deionized (DI) water (or 7.5 mL ethanol) and 0.75 mmol of phenanthroline is dissolved in 7.5 mL of ethanol (99.9%) separately. These two solutions are mixed to form [Fe(phen)$_3$]SO$_4$ (phen represents phenanthroline), which is stirred at room temperature. 0.25 mmol of CoSO$_4$·7H$_2$O is dissolved in 7.5 mL of deionized (DI) water (or 7.5 mL ethanol) and 0.75 mmol of phenanthroline is dissolved in 7.5 mL of ethanol (99.9%) separately. These two solutions are mixed to form [Co(phen)$_3$]SO$_4$, which is stirred at room temperature.

The [Fe(phen)$_3$]SO$_4$ solution and the [Co(phen)$_3$]SO$_4$ solution are mixed and to this mixed solution, a 30 mL ethanol solution in which 0.5 mmol of $H_2PtCl_6 \cdot 6H_2O$ is dissolved is added at a time, and the mixture is stirred for 5 hours. The product is easily separated by centrifugation at 10,000 rpm (10 min). The product is washed several times with ethanol, centrifuged and dried in an oven at 40° C. The dried product is pulverized to obtain fine powder. Thereby, the FeCoPt compound ($[Fe(phen)_3]_x[Co(phen)_3]_{1-x}[PtCl_6]$) is formed.

3) Synthesis Example 3

0.25 mmol of $FeSO_4 \cdot 7H_2O$ is dissolved in 7.5 mL of deionized (DI) water (or 7.5 mL ethanol) and 0.75 mmol of terpyridine is dissolved in 7.5 mL of ethanol (99.9%) separately. These two solutions are mixed to form $[Fe(terpy)_2]SO_4$ (terpy represents terpyridine), which is stirred at room temperature. 0.25 mmol of $CoSO_4 \cdot 7H_2O$ dissolved in 7.5 mL of deionized (DI) water (or 7.5 mL ethanol) and 0.75 mmol of terpyridine is dissolved in 7.5 mL of ethanol (99.9%) separately. These two solutions are mixed to form $[Co(terpy)_2]SO_4$, which is stirred at room temperature.

The $[Fe(terpy)_2]SO_4$ solution and the $[Co(terpy)_2]SO_4$ solution are mixed and to this mixed solution, a 30 mL ethanol solution in which 0.5 mmol of $H_2PtCl_6 \cdot 6H_2O$ is dissolved is added at a time, and the mixture is stirred for 5 hours. The product is easily separated by centrifugation at 10,000 rpm (10 min). The product is washed several times with ethanol, centrifuged and dried in an oven at 40° C. The dried product is pulverized to obtain fine powder. Thereby, the FeCoPt compound ($[Fe(terpy)_2]_x[Co(terpy)_2]_{1-x}[PtCl_6]$) is formed.

Unlike synthesis examples 1 to 3, after dissolving $FeSO_4 \cdot 7H_2O$ and $CoSO_4 \cdot 7H_2O$ in deionized water (or ethanol), a solution containing a pyridine-based compound may be added to the solution. For example, 0.25 mmol of $FeSO_4 \cdot 7H_2O$ and 0.25 mmol of $CoSO_4 \cdot 7H_2O$ are dissolved in 15 mL of deionized water (or 15 mL of ethanol), 1.5 mmol of 2,2'-bipyridine (or 1.5 mmol of phenanthroline, 1.0 mmol of terpyridine) is separately dissolved in 15 mL of ethanol, and then the two solutions may be mixed. Subsequent processes are the same as in synthesis examples 1 to 3 above.

Synthesis Example of FeCoPt/rGO

The FeCoPt compound is dispersed in 80 mL of deionized water. The mixture in which the FeCoPt compound is dispersed is sonicated for 10 minutes, stirred for 2 hours, and then 10 mL of an GO aqueous solution (4 mg/mL) is added dropwise. The mixture to which the GO aqueous solution is added is stirred for 2 hours and then freeze-dried to adsorb the FeCoPt compound to the GO. The mixture containing FeCoPt compound grains on GO foam is heat-treated at 700° C. for 6 hours in an argon flow of 100 sccm, during the heat treatment, wetting and decomposition of the FeCoPt compound occurred on the GO surface, forming atomically ordered FeCoPt alloy nanoparticles on rGO (FePt/rGO).

Synthesis Example of FeCoPt Nanoparticles on Different Carbon Supports

The synthesis of FeCoPt nanoparticles on carbon nanotube (CNT, 7-8 wt % in water) is performed according to the same procedure as that for FeCoPt/rGO except that CNT aqueous solution is added dropwise instead of the GO solution.

The synthesis of FeCoPt nanoparticles on Ketjen Black (KB) and Vulcan XC (VC) is performed by the following procedure. After dispersing a certain amount of FeCoPt compound in 80 mL of isopropanol (or ethanol), the solution is sonicated for 10 min and stirred for 2 h. 50 mg of KB or VC powder is added into the solution containing FeCoPt compound and this mixture is sonicated for 10 min and stirred for 2 h. The mixture containing FeCoPt compound grains on carbon support is obtained by rotary evaporation and dried in oven at 40° C. The dried powder is ground and then heat-treated at 700° C. under argon atmosphere.

Synthesis Examples of FeNiPt Nanoparticles and CoNiPt Nanoparticles on rGO

FeNiPt compounds (e.g., $[Fe(bpy)_3]_x[Ni(bpy)_3]_{1-x}[PtCl_6]$, $[Fe(phen)_3]_x[Ni(phen)_3]_{1-x}[PtCl_6]$, $[Fe(terpy)_2]_x$ $[Ni(terpy)_2]_{1-x}[PtCl_6]$) and CoNiPt compounds (e.g., $[Co(bpy)_3]_x[Ni(bpy)_3]_{1-x}[PtCl_6]$, $[Co(phen)_3]_x[Ni(phen)_3]_{1-x}$ $[PtCl_6]$, $[Co(terpy)_2]_x[Ni(terpy)_2]_{1-x}[PtCl_6]$) are prepared by the same procedure for the synthesis of FeCoPt compound except that $FeSO_4 \cdot 7H_2O$ and $NiSO_4 \cdot 6H_2O$ are used or $CoSO_4 \cdot 7H_2O$ and $NiSO_4 \cdot 6H_2O$ are used in place of $FeSO_4 \cdot 7H_2O$ and $CoSO_4 \cdot 7H_2O$. The subsequent synthetic processes for the synthesis of FeNiPt/rGO and CoNiPt/rGO is the same as that for the synthesis of FeCoPt/rGO.

Figure 6:
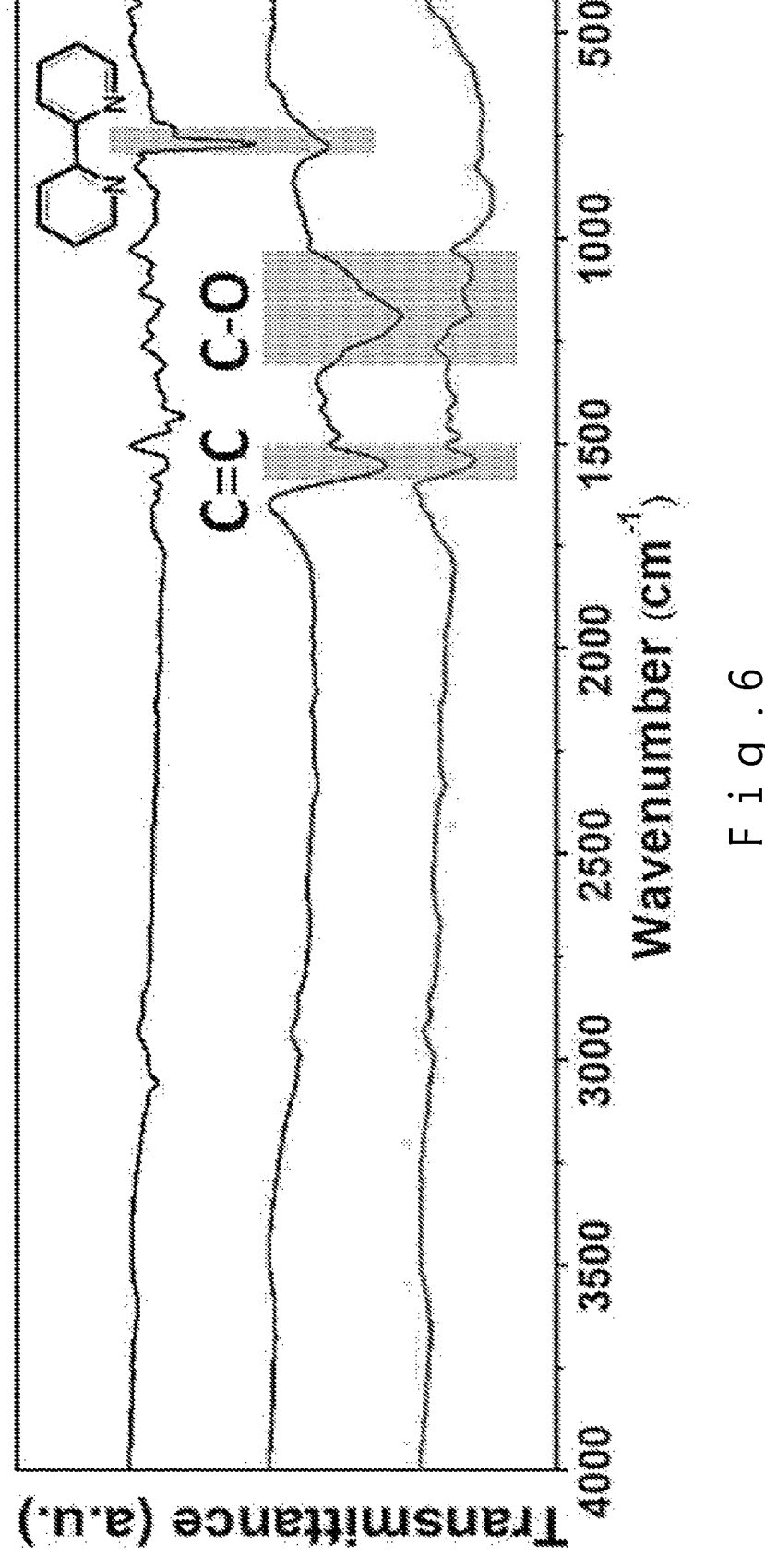
FIG. 6 shows the results of FT-IR analysis of the $[Fe(bpy)_3]$ $[PtCl_6]/GO$, the intermediate, and the FePt/rGO.

FIG. 5 shows the results of powder XRD analysis of the $[Fe(bpy)_3]$ $[PtCl_6]$/GO, the intermediate, and the FePt/rGO, FIG. 6 shows the results of FT-IR analysis of the $[Fe(bpy)_3]$ $[PtCl_6]$/GO, the intermediate, and the FePt/rGO, and FIG. 7 shows a STEM-EDS mapping image showing the uniform distribution of C, Pt, and Fe atoms in the intermediate.

Referring to FIG. 5, the intermediate obtained at 500° C. has a smooth surface without any crystalline feature of FePt compound in the XRD pattern Referring to FIG. 6, Fourier-transform infrared spectroscopy (FT-IR) provides additional structural information of the intermediate, indicating the decomposition of bipyridine ligands with the evolution of C—O and C=C functional groups Referring to FIG. 7, STEM-EDS mapping clearly demonstrates the homogeneous decomposition of FePt compound on GO. As confirmed by TEM and SEM (scanning electron microscopy) images, uniform sized alloy nanoparticles are observed without significant agglomeration. Carbon shells containing N on the surface of nanoparticles are identified by high-resolution STEM and TEM images. The carbon shell may be derived from a bipyridine ligand, and acts as a protective shell, contributing to the uniform and stable growth of alloy nanoparticles during heat treatment at 700° C.

Figure 9:
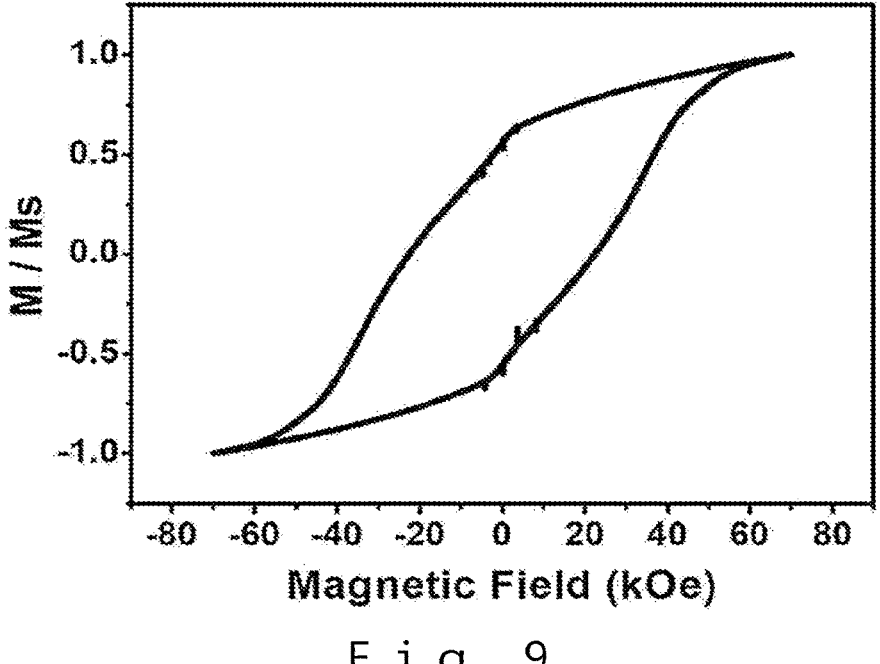
FIG. 9 shows the magnetic hysteresis loop of 37 wt % FePt/rGO.
Figure 10:
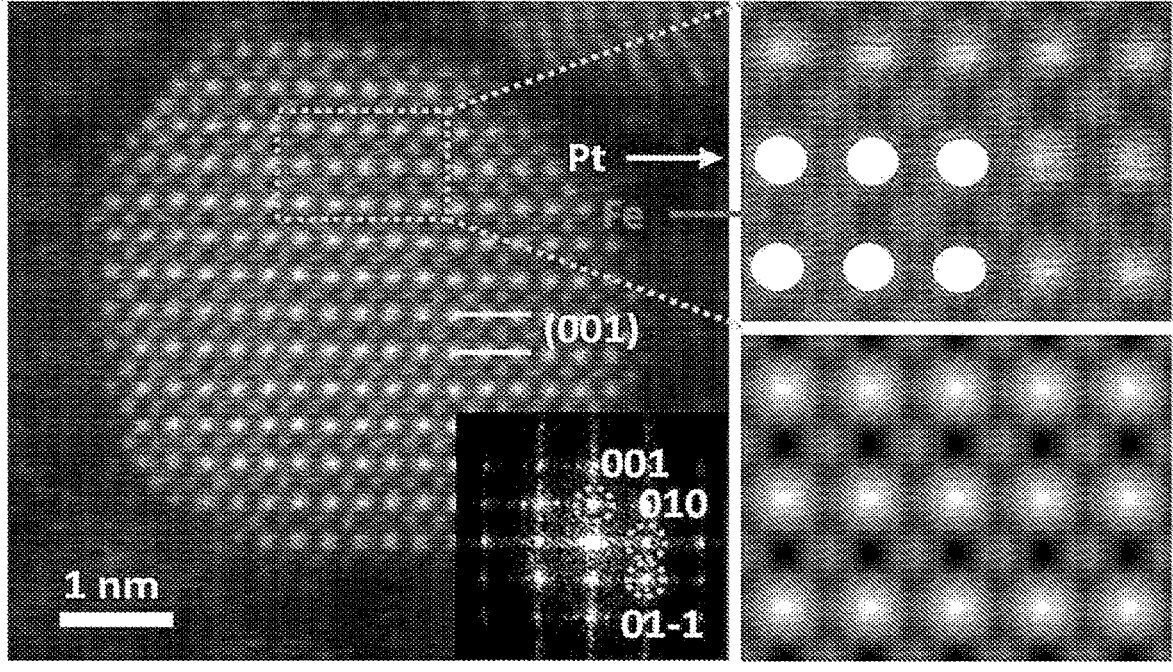
FIG. 10 shows a HAADF-STEM image of 37 wt % FePt/rGO and a magnified image and a simulated image of $L1_0$-FePt nanocrystals.

FIG. 8 shows the XRD pattern of 37 wt % FePt/rGO, FIG. 9 shows the magnetic hysteresis loop of 37 wt % FePt/rGO, FIG. 10 shows a HAADF-STEM image of 37 wt % FePt/rGO and a magnified image and a simulated image of $L1_0$-FePt nanocrystals, and FIG. 11 shows STEM-EDS images of a single FePt nanoparticle (top) and high magnification region (bottom) of 37 wt % FePt/rGO.

Referring to FIGS. 8 and 9, the crystal structure of FePt nanoparticles can be evaluated through powder XRD analysis and magnetic analysis. The XRD peaks of FePt nanoparticles are in good agreement with the XRD peaks of the $L1_0$-FePt phase, and are clearly different from other phases such as Fe, Pt, $L1_2$-$Fe_3Pt$ and $L1_2$-FePt3. In addition, the ferromagnetism on $L1_0$-FePt phase is identified with a high coercive force of 22.5 kOe at room temperature.

Referring to FIG. 10, a layer-by-layer atomic arrangement along the (001) plane in a $L1_0$-FePt nanoparticle is clearly distinguished by the large difference in the contrast of Fe and Pt atoms. The fast Fourier transform (FFT) pattern of the atomic image verifies the face-centered tetragonal crystal structure of the $L1_0$-FePt phase.

Referring to FIG. 11, The homogeneous distribution of Fe and Pt atoms in the FePt nanoparticles is established by EDS single-particle mapping. Furthermore, a magnified EDS mapping reveals a layer-by-layer distribution of Fe and Pt atoms.

Thus, the homogeneous 1:1 Fe to Pt atomic ratio of the FePt compound is maintained in an atomically ordered way after the formation of alloy nanoparticles on rGO, as corroborated by XRD, magnetic measurements, HAADF-STEM imaging, and EDS mapping.

FIG. 12 shows a TEM image of 24 wt % FePt/rGO, and the inset shows the size distribution of FePt nanoparticles, and FIG. 13 shows a TEM image of 37 wt % FePt/rGO, and the inset shows the size distribution of FePt nanoparticles. Insets in FIGS. 12 and 13 show the size distribution of FePt nanoparticles.

FIG. 14 shows ORR polarization curves of FePt/rGO catalyst and commercial Pt/C catalyst, and FIG. 15 shows Tafel plots of FePt/rGO catalyst and commercial Pt/C catalyst.

Referring to FIGS. 14 and 15, the FePt/rGO catalyst shows good ORR activity, and the reaction current density calculated from the Koutechy-Levich equation is compared in Tafel plots. In all regions, $L1_0$-FePt alloy nanoparticles of FePt/rGO exhibit higher reaction current density than Pt/C.

FIG. 16 shows ECSA of FePt/rGO catalyst and commercial Pt/C catalyst, and FIG. 17 shows the activity per unit weight and per unit area of FePt/rGO catalyst and commercial Pt/C catalyst.

Referring to FIG. 16, the electrochemical surface area (ECSA) values calculated based on the oxidative charge of CO molecules were compared with those based on $H_{upd}$. The $ECSA_{CO}$ values are 53.4 and 45.7 $m^2/g_{Pt}$ for 24 wt %-FePt/rGO and 37 wt %-FePt/rGO, which are 32 and 41% lower than for Pt/C, respectively, due to the larger particle size.

Referring to FIG. 17, the activities per unit weight of 24 wt %-FePt/rGO and 37 wt %-FePt/rGO at 0.9 V are calculated as 1.18 and 1.96 $A/mg_{Pt}$, which are 6.9 times and 11.5 times higher than that of commercial Pt/C, respectively. Despite the 15% lower ECSA value, the activity per unit weight of 37 wt %-FePt/rGO is 66% higher than that of 24 wt %-FePt/rGO. This can be attributed to the higher level of Fe—Pt atomic alignment in 37 wt %-FePt/rGO. The improved ORR activity for the Pt alloy surface is due to the enhanced electronic interaction between Pt and transition metal atoms.

The high level of atomic alignment in 37 wt %-FePt/rGO can maximize the ligand effect between Pt and Fe, resulting in much higher ORR activity per unit area. The activities per unit area of 24 wt %-FePt/rGO and 37 wt %-FePt/rGO at 0.9 V are 2.21 and 4.1 $mA/cm_{Pt}^2$, which are 10.2 times and 18.8 times higher than that of commercial Pt/C, respectively.

FIG. 18 shows ORR polarization curves of FePt/rGO catalyst and commercial Pt/C catalyst before and after ADT (20,000 cycles), FIG. 19 shows Tafel plots of FePt/rGO catalyst and commercial Pt/C catalyst before and after ADT (20,000 cycles), FIG. 20 shows ECSA of FePt/rGO catalyst and commercial Pt/C catalyst before and after ADT (20,000 cycles), and FIG. 21 shows activities per unit weight and per unit area of FePt/rGO catalyst and commercial Pt/C catalyst before and after ADT (20,000 cycles).

Referring to FIGS. 18 to 21, to evaluate the long-term stability of FePt/rGO, accelerated degradation test (ADT) was performed by cycling the electrode between 0.6 and 1.0

V for 20,000 cycles under Ar-saturation condition. After ADT, FePt/rGO showed little change in the CV curve, whereas the $H_{upd}$ region of Pt/C decreased significantly. The strong stability of FePt/rGO compared to Pt/C can also be confirmed by ORR polarization curves and Tafel plots. After ADT, the ECSA of Pt/C decreased by 30%, whereas the ECSA of the FePt/rGO sample increased slightly by 4-7%. In terms of activity per unit weight and activity per unit area, Pt/C showed a significant decrease of 60% and 44%, respectively, after ADT. However, the activity per unit weight of FePt/rGO slightly increased, whereas the activity per unit area remained almost unchanged after ADT. From TEM analysis and EDS mapping of three different sites, it was possible to further confirm the stability of FePt nanoparticles under harsh ADT conditions that induce particle-particle aggregation and Fe-dissolution. Therefore, the carbon shell containing N and the high degree of interatomic arrangement inside the FePt nanoparticles are major factors contributing to the stability of the FePt/rGO nanocatalyst synthesized according to the embodiment of the present invention.

FIG. 22 shows a TEM image of NiPt/rGO (46 wt %) and FIG. 23 shows STEM-EDS images of NiPt/rGO (46 wt %). FIG. 24 shows a TEM image of CoPt/rGO (22 wt %) and FIG. 25 shows STEM-EDS images of CoPt/rGO (22 wt %). FIG. 26 shows powder XRD patterns of NiPt/rGo and CoPt/rGo and FIG. 27 shows ORR polarization curves of NiPt/rGo and CoPt/rGo.

Referring to FIGS. 22 to 27, other platinum alloy nanoparticles can be formed by using $[Ni(bpy)_3]^{2+}$ or $[Co(bpy)_3]^{2+}$ instead of $[Fe(bpy)_3]^{2+}$.

NiPt compounds and CoPt compounds are thermally decomposed into NiPt and CoPt nanoparticles on rGO under the same annealing conditions as FePt compounds, respectively. In the TEM and STEM-EDS images of NiPt/rGO and CoPt/rGO, NiPt and CoPt alloy nanocrystals are uniformly formed in rGO as in the case of FePt/rGO. The bimetallic alloy structure was confirmed by the XRD pattern, and the ORR activity of NiPt/rGO (46 wt %) and CoPt/rGO (22 wt %) was measured to be good.

Although the embodiments of the present invention have been disclosed for illustrative purposes, those skilled in the art will appreciate that the present invention may be embodied in other specific ways without changing the technical spirit or essential features thereof. Therefore, the embodiments disclosed in the present invention are not restrictive but are illustrative. The scope of the present invention is given by the claims, rather than the specification, and also contains all modifications within the meaning and range equivalent to the claims.

Industrial Applicability

Alloy nanoparticles and an alloy nanocatalyst according to the embodiments of the present invention have good performance. For example, the alloy nanoparticles and the alloy nanocatalyst may have good activity and stability. The alloy nanoparticles and the alloy nanocatalyst can be easily formed by a simple process. The alloy nanocatalyst may have good ORR (oxygen reduction reaction) activity, and thus may be used as an electrocatalyst.

The invention claimed is:
1. A method for forming alloy nanoparticles comprising:
mixing a first metal complex including a first metal and a second metal complex including a second metal to form a multimetal compound;
adsorbing the multimetal compound to a support;

heat-treating the multimetal compound to form an alloy compound; and performing a thermal etching on the alloy compound, wherein the first metal and the second metal comprise transition metal, wherein the first metal complex comprises a pyridine-based ligand, wherein a carbon shell containing N is formed on the surface of the alloy compound by the heat treatment, and wherein at least a portion of the shell is removed by the thermal etching.

2. The method for forming alloy nanoparticles of claim 1, wherein the pyridine-based ligand comprises at least one of a pyridine ligand and a polypyridine ligand, wherein the pyridine ligand comprises a pyridine and derivatives derived from the pyridine, and wherein the polypyridine ligand comprises a polypyridine and derivatives derived from the polypyridine.

3. The method for forming alloy nanoparticles of claim 1, wherein the second metal complex comprises a halogen element.

4. The method for forming alloy nanoparticles of claim 1, wherein the first metal comprises at least one of Fe, Co, and Ni, and the second metal comprises Pt.

5. The method for forming alloy nanoparticles of claim 1, wherein the first metal complex comprises $M^1(PY)_m^{a+}$ ($M^1$ represents the first metal, PY represents the pyridine-based ligand, and m represents an integer of 6 or less), and wherein the second metal complex comprises $M^2X_n^{a-}$ ($M^2$ represents the second metal, X represents a halogen element, and n represents an integer of 6 or less).

6. The method for forming alloy nanoparticles of claim 1, wherein the first metal complex comprises $[M^{1A}(PY)_m]_x$ $[M^{1B}(PY)_m]_{1-x}^{a+}$ ($M^{1A}$ and $M^{1B}$ each represent the first metal, with $M^{1B}$ being different from $M^{1A}$, PY represents the pyridine-based ligand, and m represents an integer of 6 or less), and wherein the second metal complex comprises $M^2X_n^{a-}$ ($M^2$ represents the second metal, X represents a halogen element, and n represents an integer of 6 or less).

7. The method for forming alloy nanoparticles of claim 1, wherein the first metal complex and the second metal complex are coupled to each other through electrostatic attraction.

8. The method for forming alloy nanoparticles of claim 1, wherein the support comprises a carbon support.

9. A method for forming alloy nanoparticles comprising:

mixing a first metal complex including a first metal and a second metal complex including a second metal to form a multimetal compound;

adsorbing the multimetal compound to a support; and heat-treating the multimetal compound to form an alloy compound, wherein the first metal and the second metal comprise transition metal, wherein the first metal complex comprises a pyridine-based ligand, wherein a carbon shell containing N is formed on the surface of the alloy compound by the heat treatment, and wherein a wetting of the multimetal compound occurs on the support by the heat treatment, and the multimetal compound is decomposed into the alloy compound.

10. A method for forming alloy nanoparticles comprising:

mixing a first metal complex including a first metal and a second metal complex including a second metal to form a multimetal compound;

adsorbing the multimetal compound to a support;

heat-treating the multimetal compound to form an alloy compound; and freeze-drying the support to which the multimetal compound is adsorbed before the heat treatment, wherein the first metal and the second metal comprise transition metal, wherein the first metal complex comprises a pyridine-based ligand, and wherein a carbon shell containing N is formed on the surface of the alloy compound by the heat treatment.

* * * * *